July 23, 1940.  J. H. PLOEHN  2,209,002
WHEEL MAKING MACHINE
Filed March 31, 1939  15 Sheets-Sheet 2
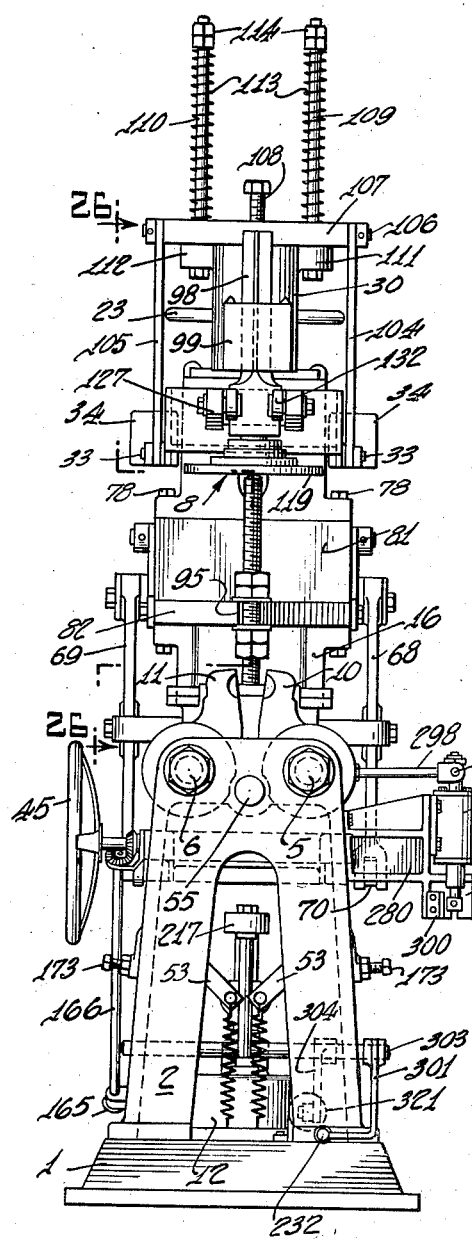
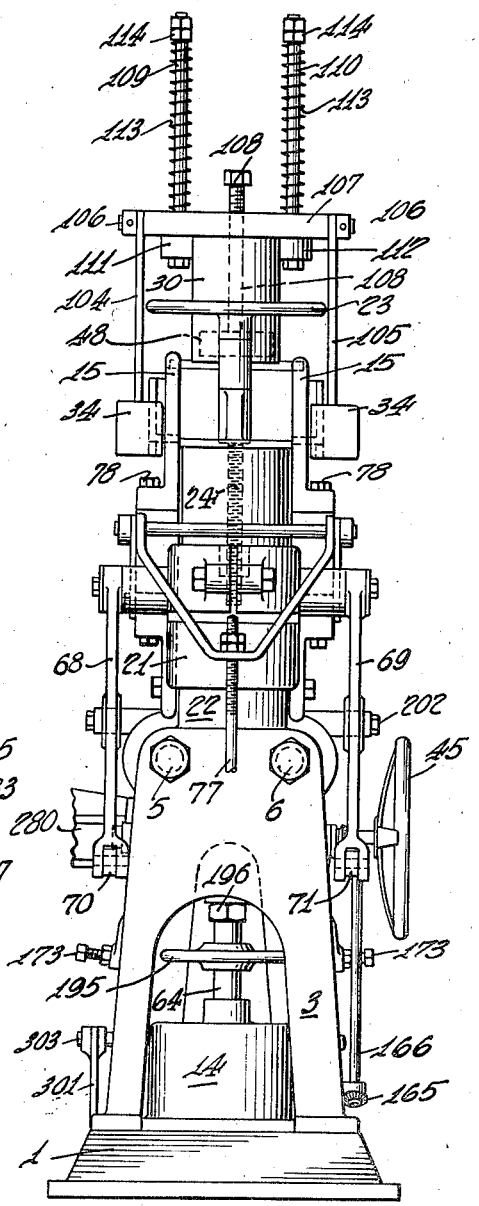
INVENTOR
JOHN H. PLOEHN.
BY
Morrison, Kennedy & Campbell
ATTORNEYS.

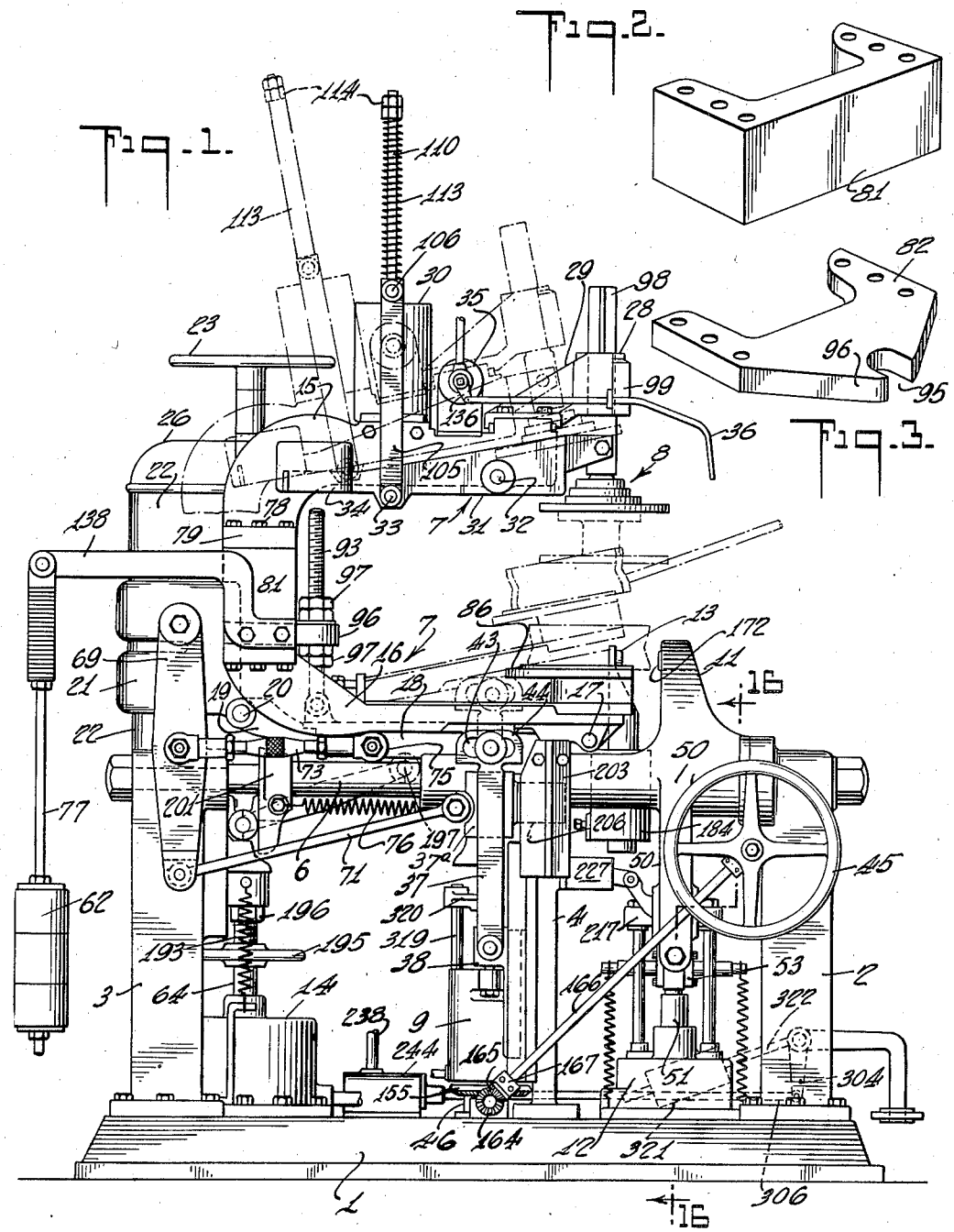

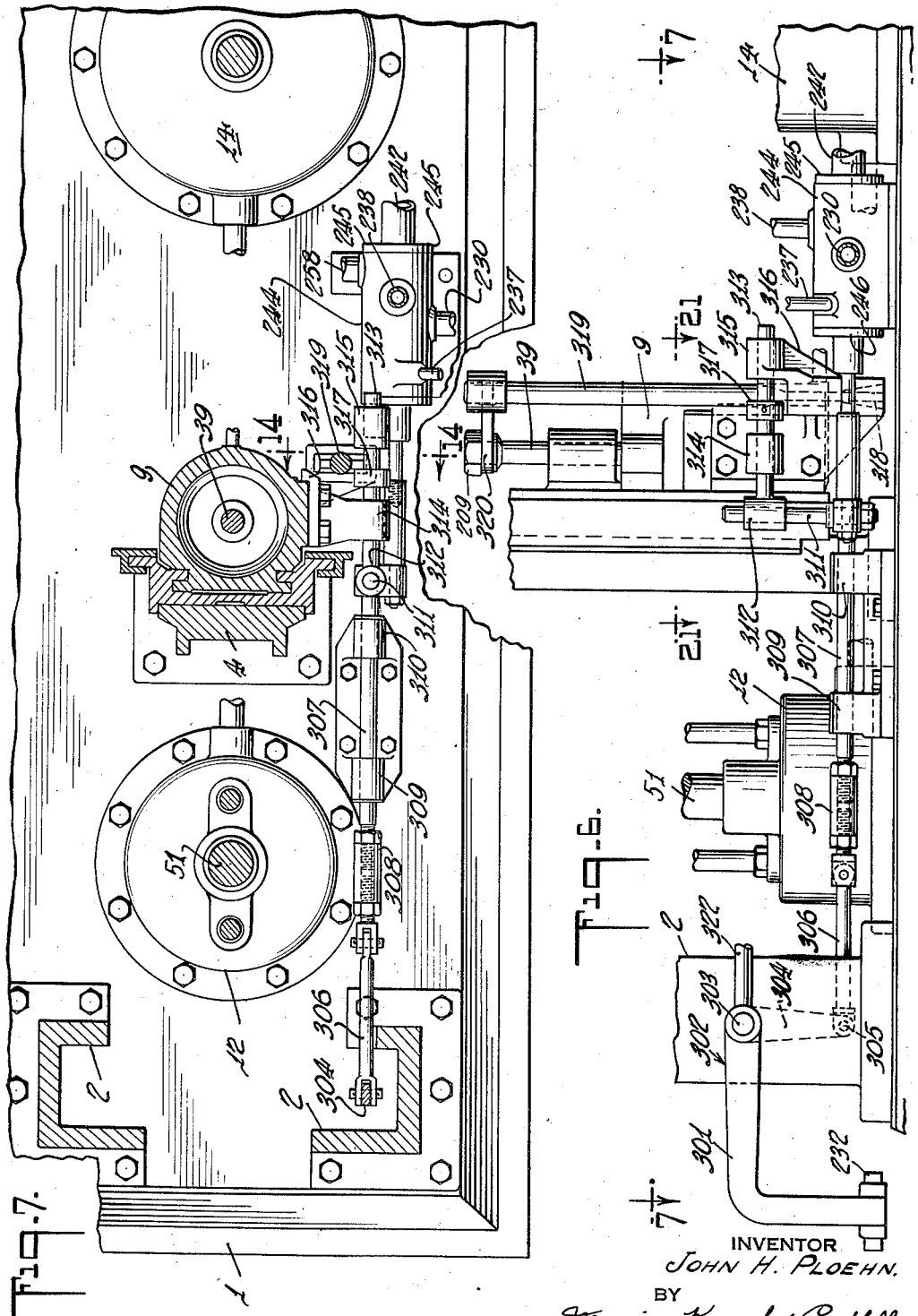

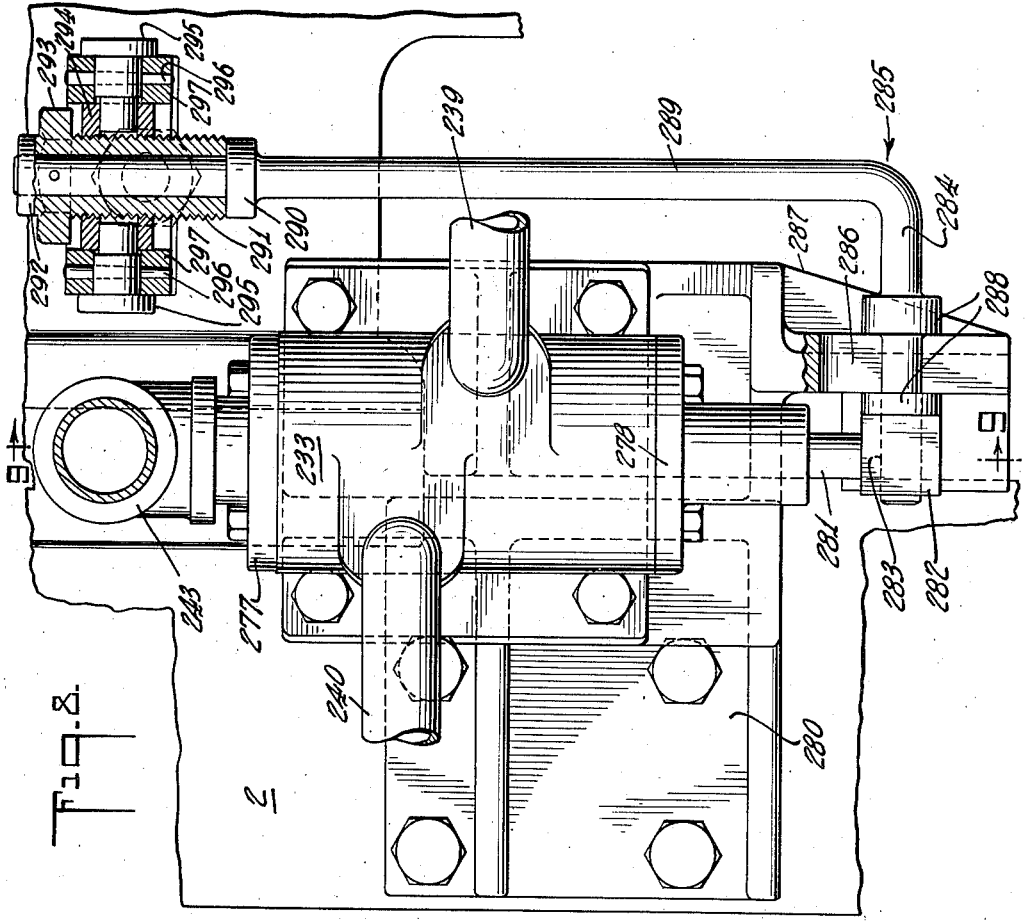
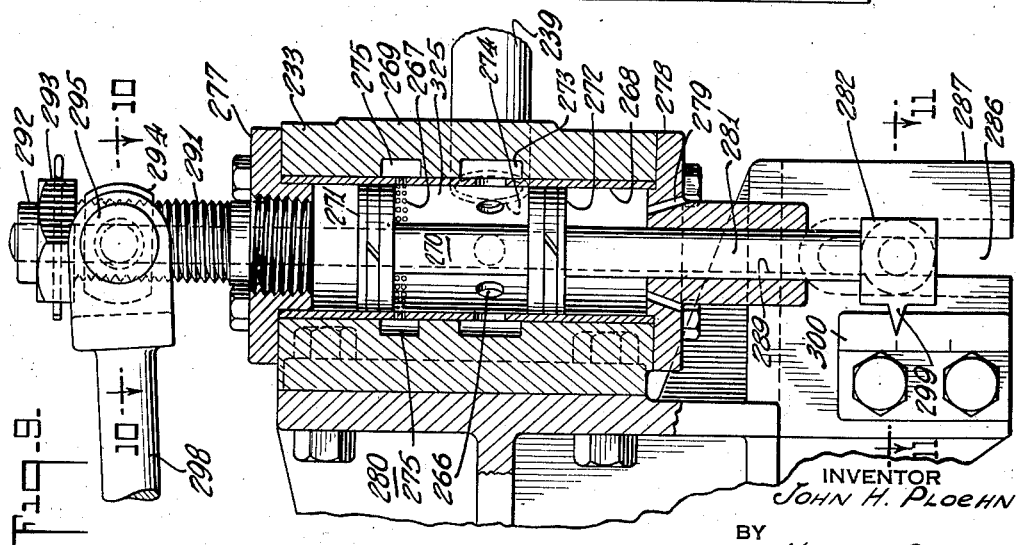

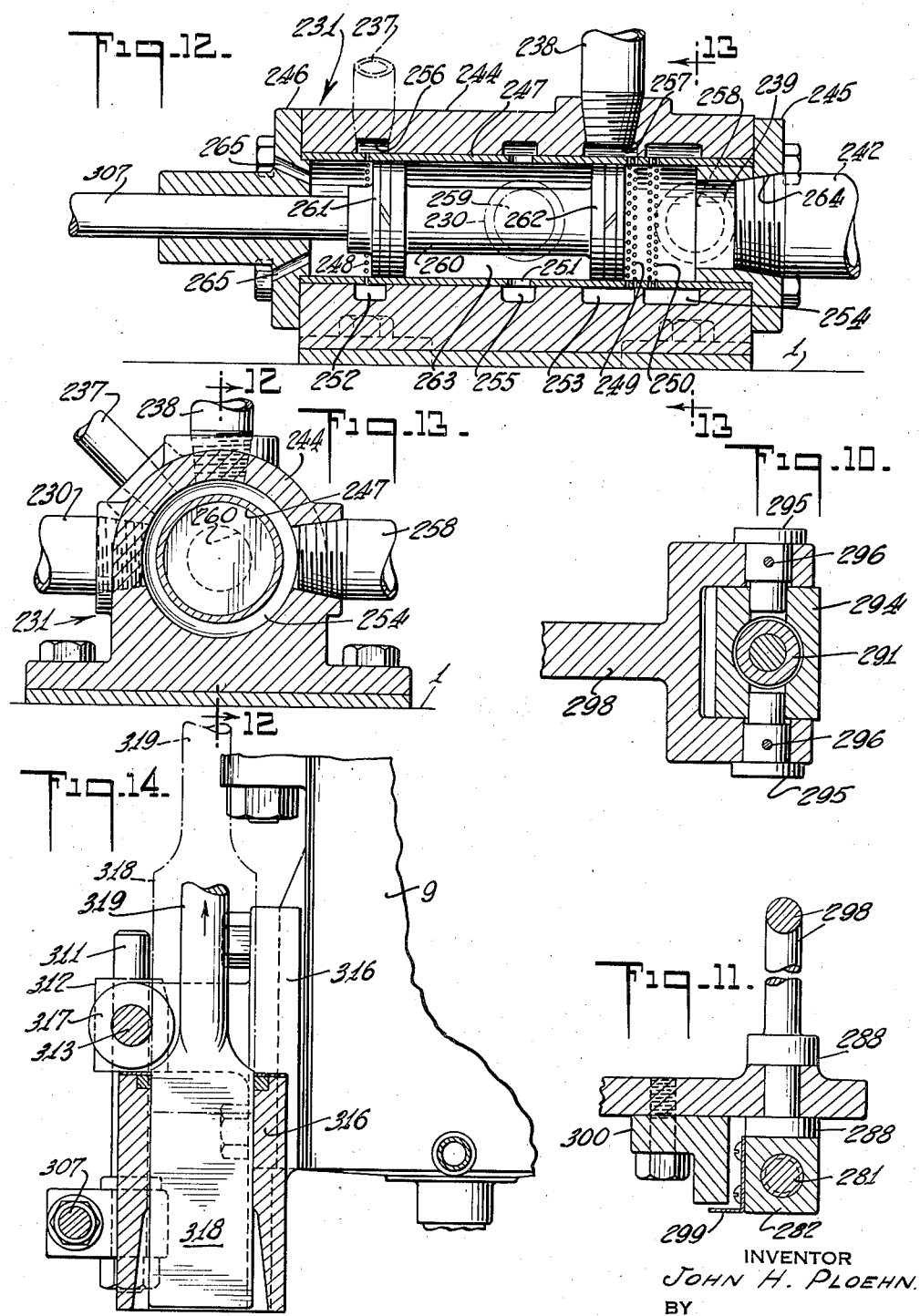

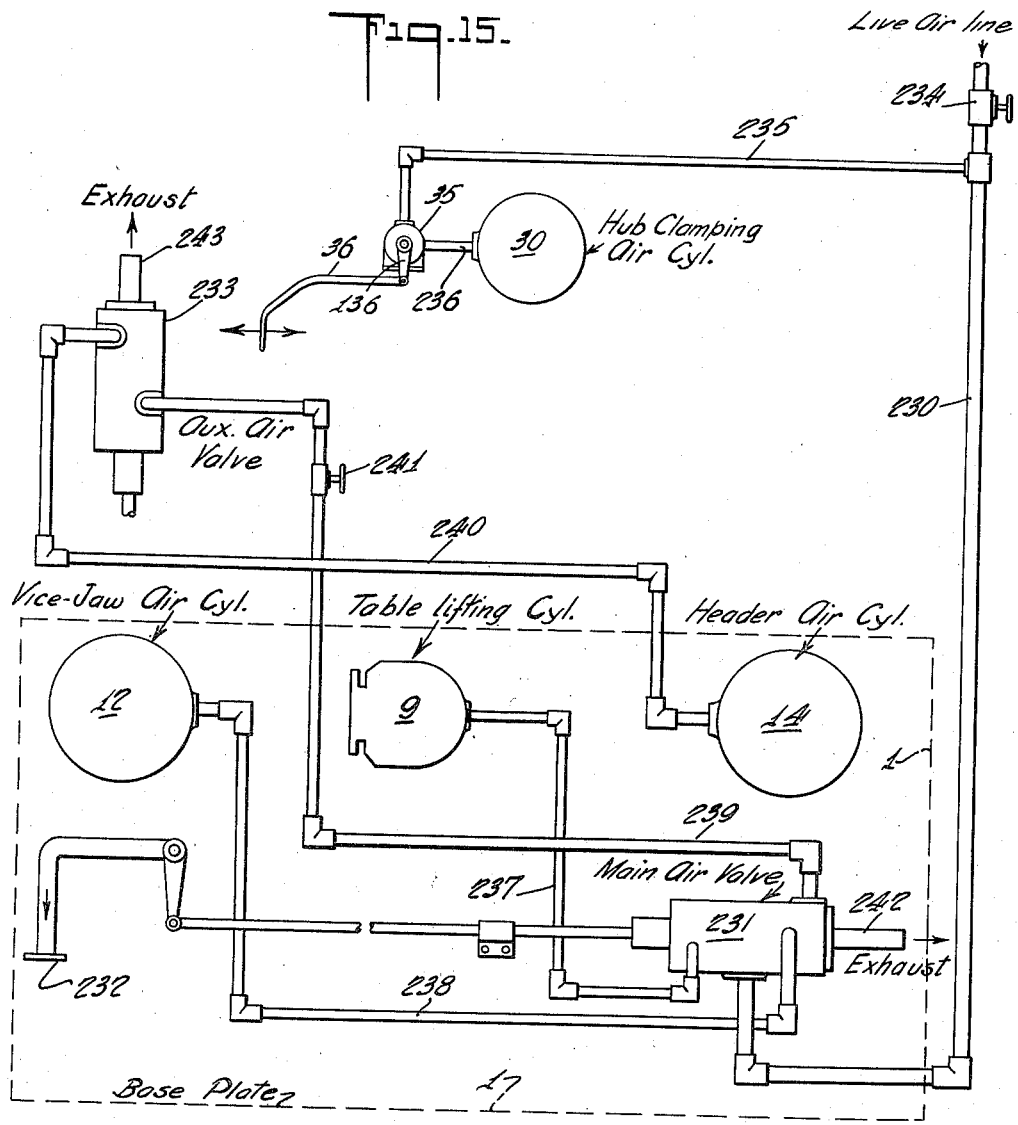

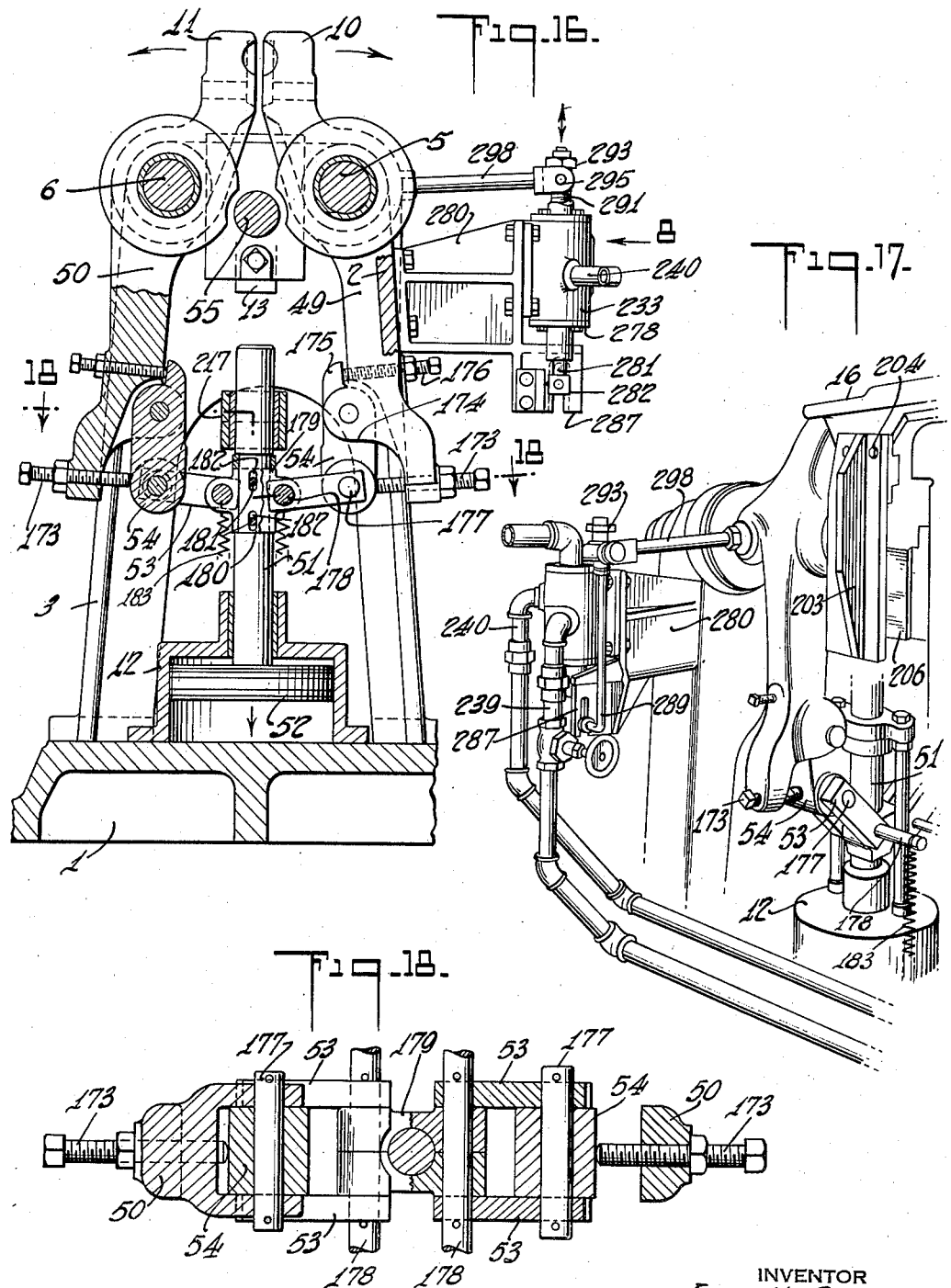

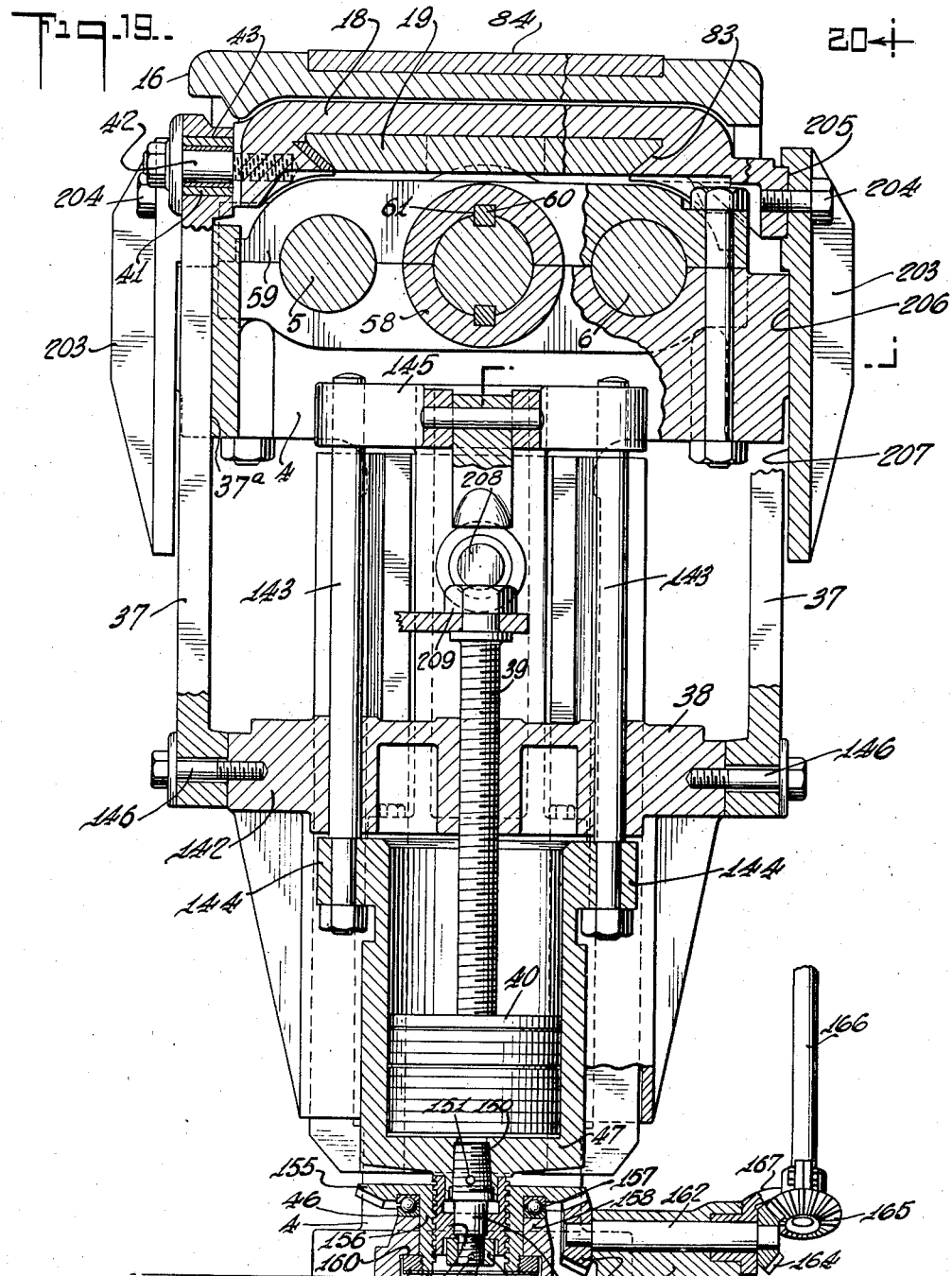

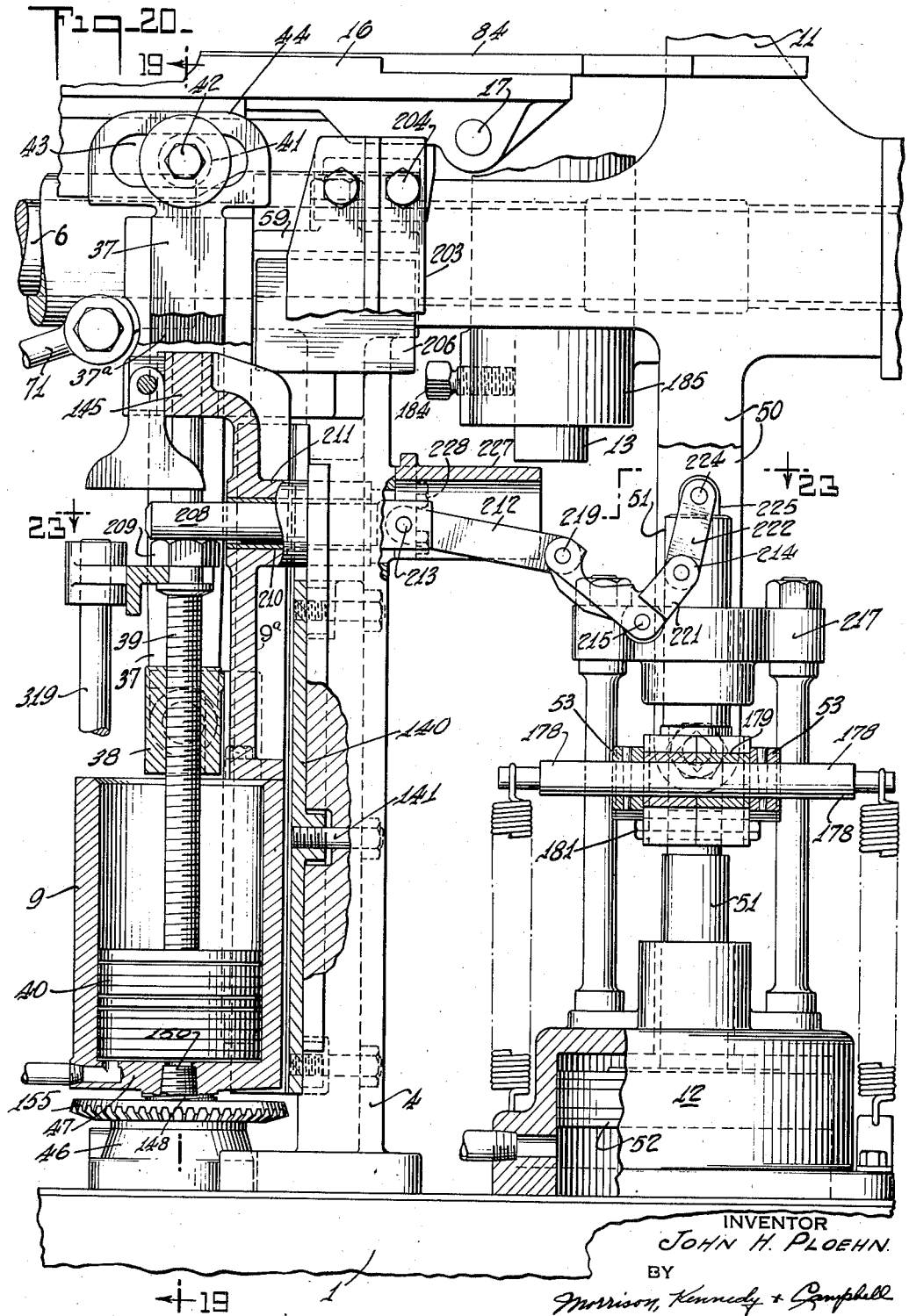

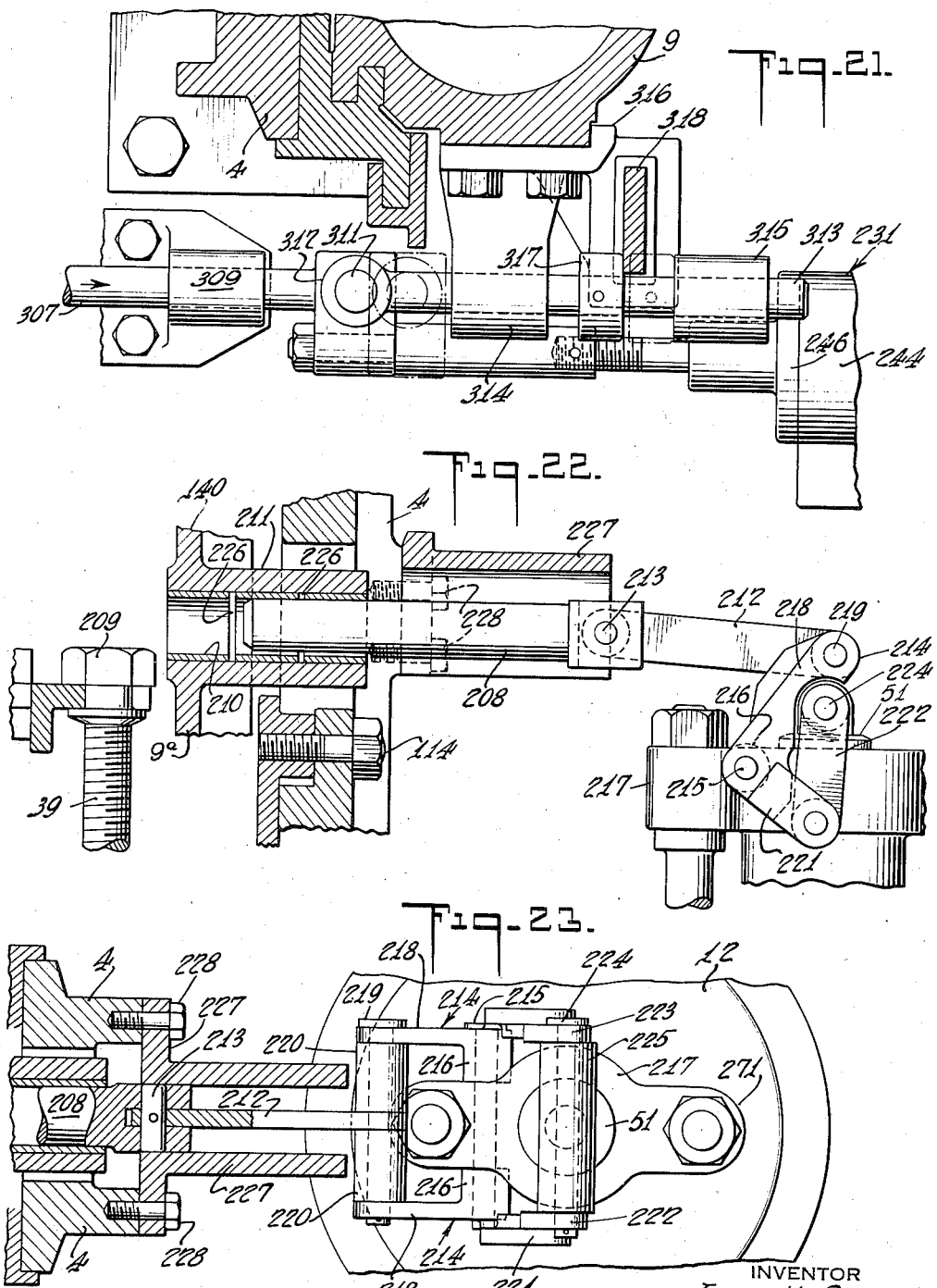

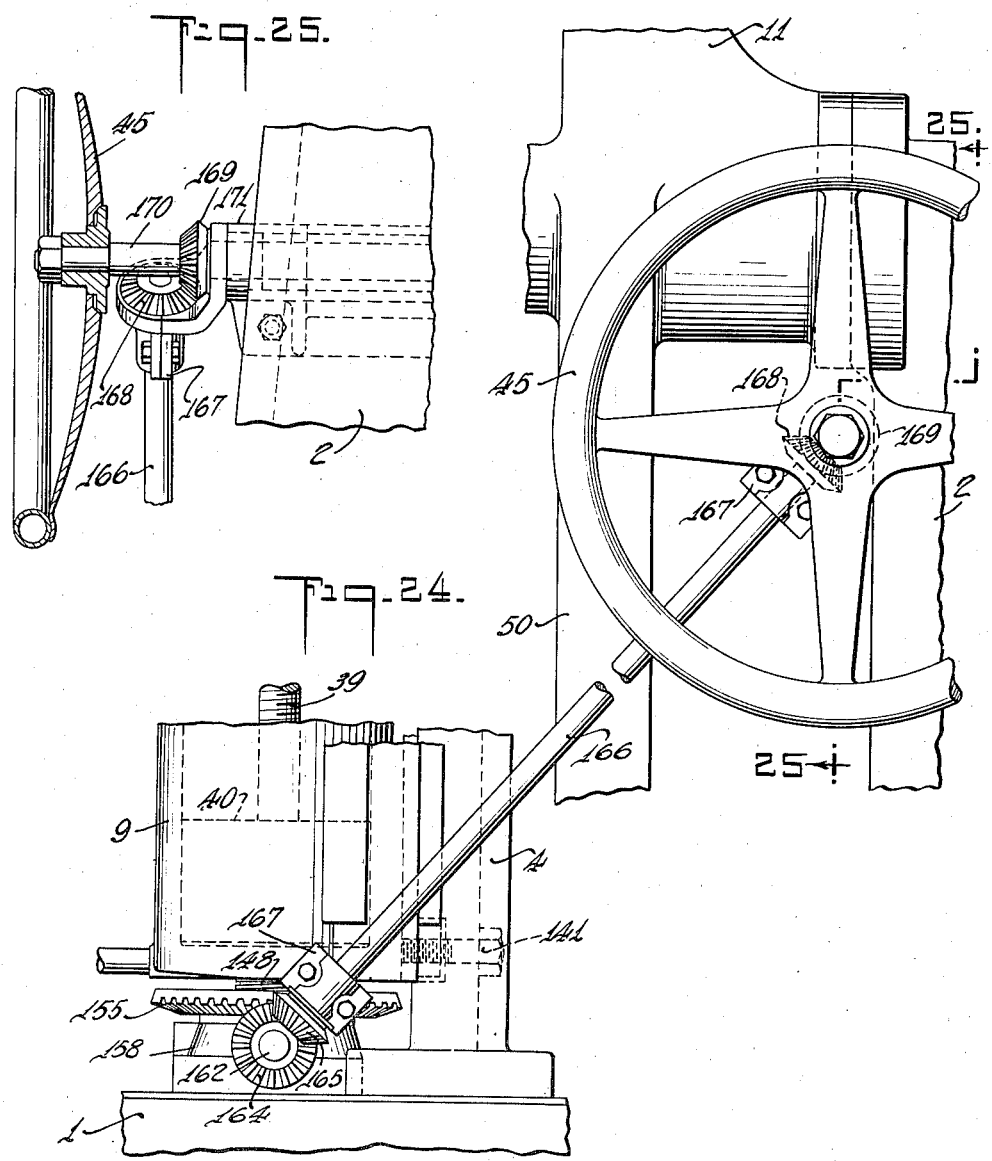

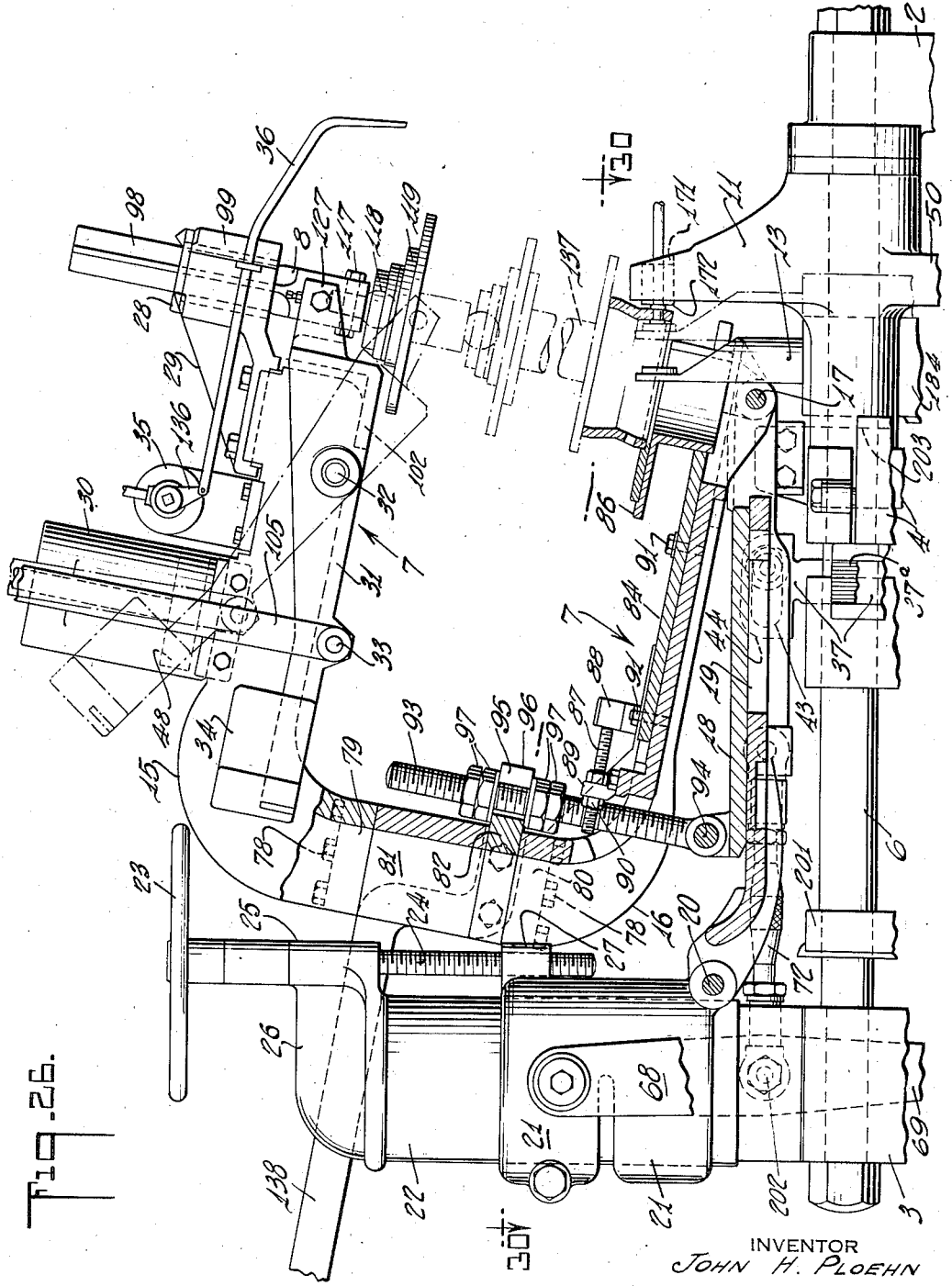

July 23, 1940.     J. H. PLOEHN     2,209,002
WHEEL MAKING MACHINE
Filed March 31, 1939     15 Sheets-Sheet 13
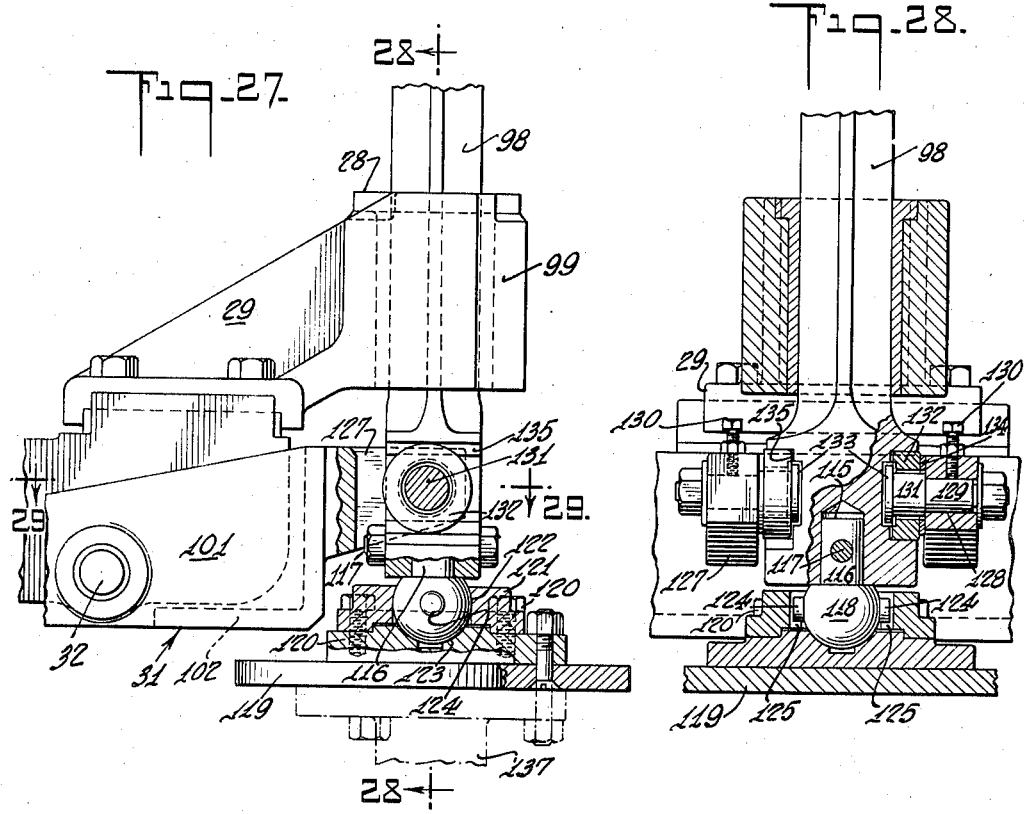
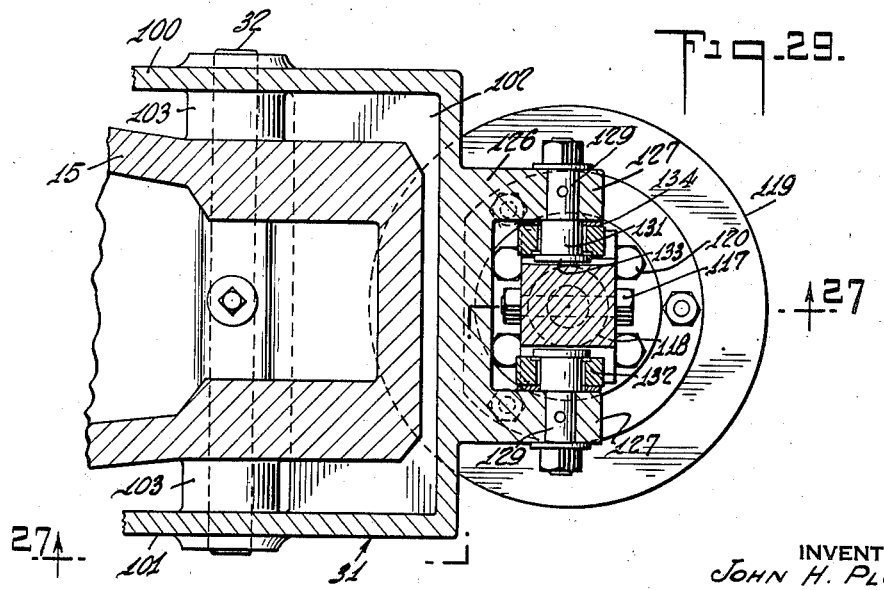
INVENTOR
JOHN H. PLOEHN
BY
Harrison, Kennedy & Campbell
ATTORNEYS.

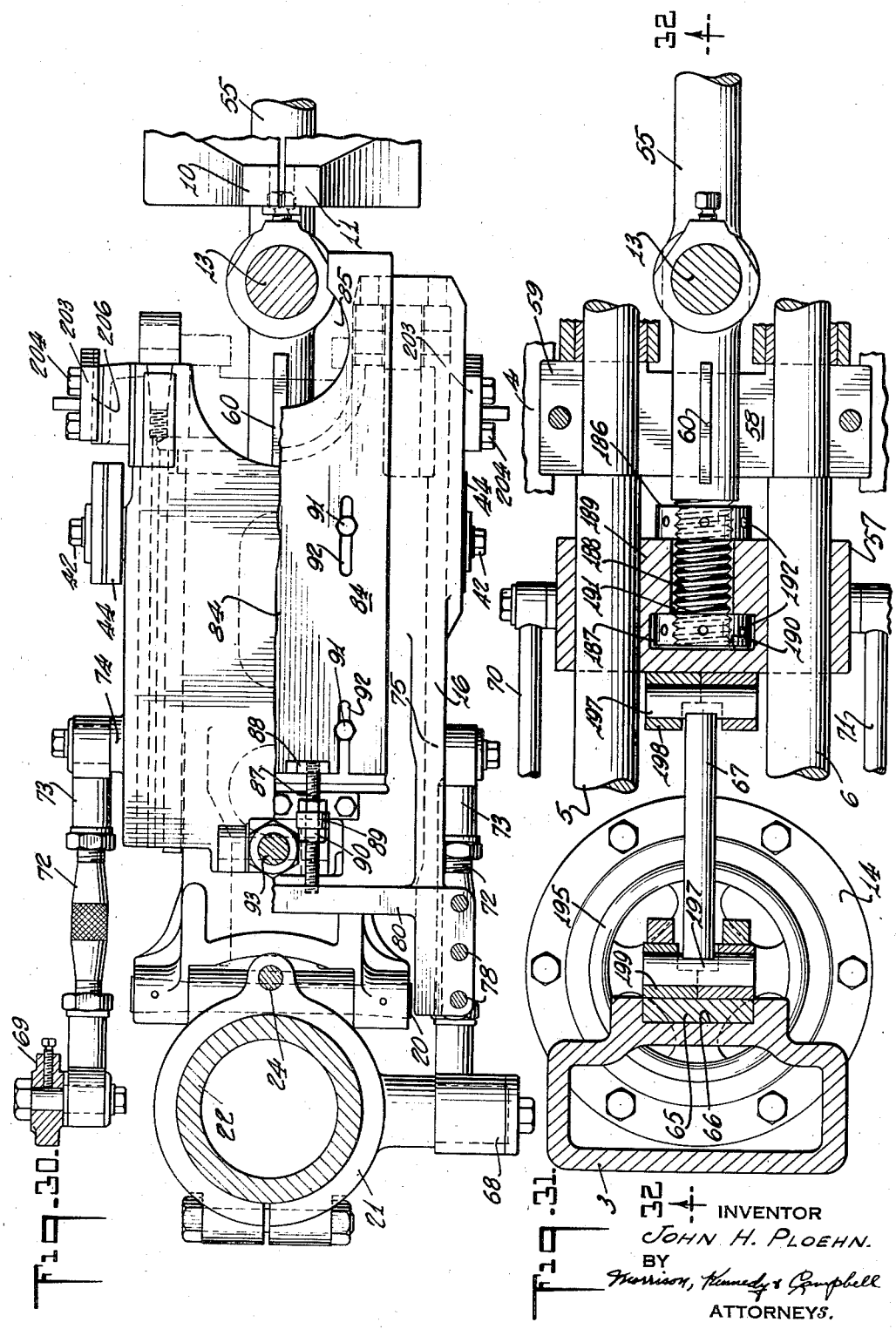

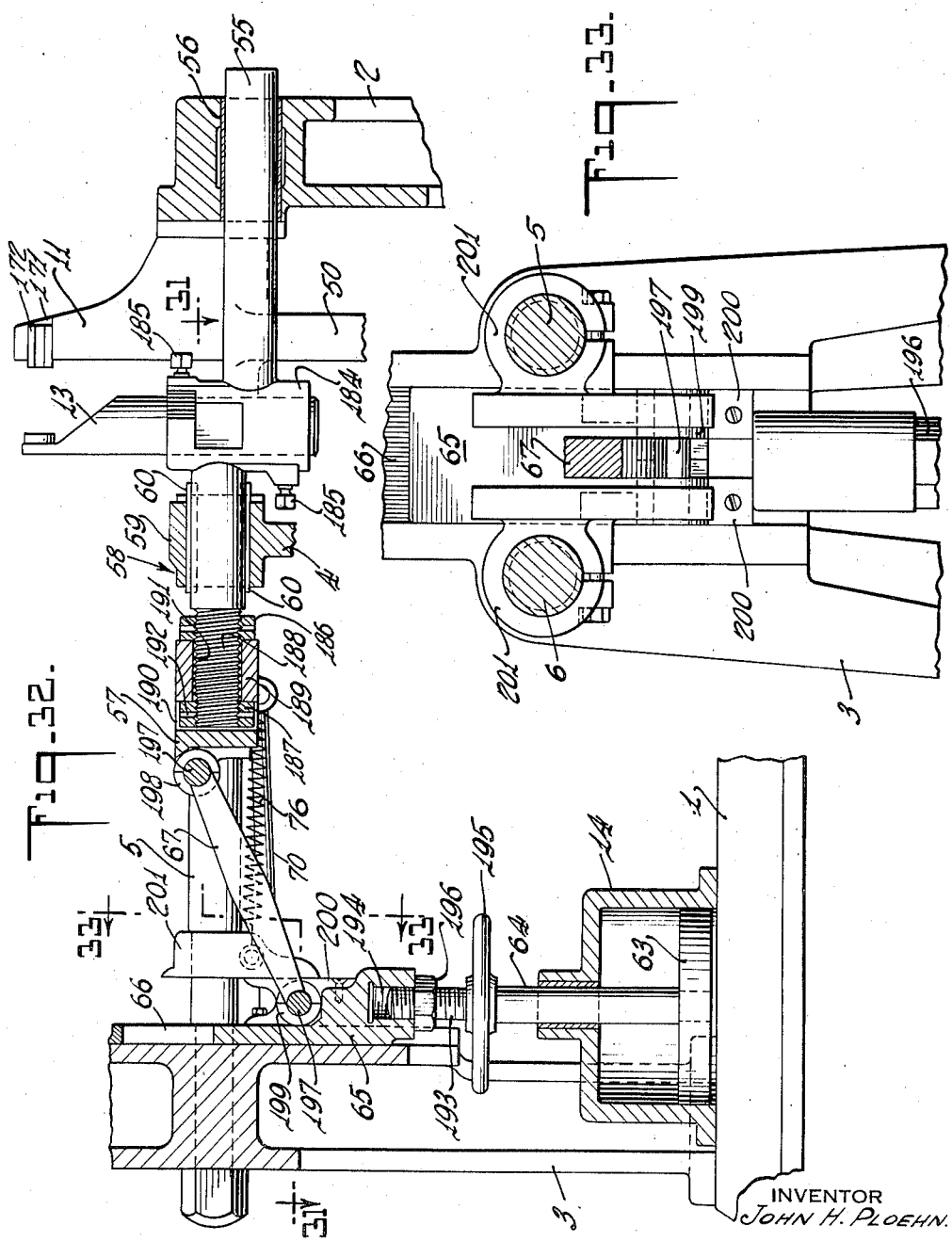

Patented July 23, 1940

2,209,002

UNITED STATES PATENT OFFICE 2,209,002

WHEEL MAKING MACHINE

John H. Ploehn, Bettendorf, Iowa, assignor to French & Hecht, Incorporated, a corporation of Iowa Application March 31, 1939, Serial No. 265,204

8 Claims. (Cl. 78—16)

This invention relates to wheel making machines of the general organization represented in U. S. Letters Patent No. 640,548, wherein a wheel hub and rim to be connected by spokes are supported in the machine in concentric relation to one another and heated spokes inserted through aligned openings in the rim and hub and upset endwise simultaneously to head over the end of the spoke inside the hub and form a shoulder on the spoke to bear against the outer surface of the hub.

In these machines, the hub and rim are supported on a pivotally mounted gooseneck table, the lower arm of which is adapted to support the hub and rim and the upper arm to carry a clamp for securing the hub in position on the table. The machine is operated pneumatically, its successive operations during each cycle being controlled by a plurality of valves or a metering valve actuable by a foot treadle. Initially, the table occupies a position with its front end tilted upward for the insertion of a spoke through the openings in the rim and hub, and when the cycle of operation of the machine is inaugurated by a partial depression of the foot treadle, the front end of the table descends to lower the hub over a spoke heading tool or header and locate the portion of the spoke outside the hub between a pair of vise jaws, which, upon further depression of the foot treadle, are actuated to clamp and hold the spoke against movement during the upsetting operation. After the spoke is clamped between the vise jaws, the foot treadle is depressed through the remainder of its downward stroke and the header inside the hub is caused to move forwardly toward the vise jaws to upset and head over the heated end of the spoke against the inner surface of the hub. At the same time, the table supporting the hub moves in the same direction as the header, but only half as far, causing the portion of the spoke between the outside of the hub and the vise jaws to be upset to form the shoulder, the vise jaws being equipped with dies into which the displaced metal flows and by which it is confined to force it against the outer surface of the hub and mold it to the desired shape. When the upsetting operation is completed, pressure on the foot treadle is released and by the return stroke of the treadle the machine is operated to effect the retraction of the table and header, the release of the vise jaws and the tilting of the front end of the table to its original upper position so that the spoke clears the top edges of the vise jaws, after which the hub clamp is released to permit the turning of the hub and rim to the proper position for operation on another spoke. The operation of the machine in the sequence just set forth is repeated for each successive spoke.

As already stated, the successive operations of the machine are controlled by valves actuated by the movement of a foot treadle connected therewith. After the hub is clamped in position on the table, the foot treadle is pressed downwardly in stages first to open a valve for the exhaust of air from a table lifting cylinder, allowing a piston therein to descend and lower the front end of the table to locate the spoke between the vise jaws and in line with the header. Continued downward movement of the foot treadle opens another valve to admit air into a cylinder and raise a piston therein to move the vise jaws into clamping engagement with the spoke; and, as the foot treadle approaches the end of its stroke, a third valve is opened to admit air to a third cylinder and raise the piston therein to move the header and table to effect the upsetting of the spoke. The return movement of the foot treadle actuates the valves in the reverse order to exhaust air from the header actuating cylinder and allow the table and header to be retracted, then exhaust the air from the vise jaw actuating cylinder to release the spoke, and finally to admit air to the table lifting cylinder to raise the piston therein and lift the front end of the table to its tilted upper position. The actuation of the foot treadle to effect the successive machine operations is entirely under the control of the operator and requires skillful manipulation; and, moreover, because the header and table are retracted before the vise jaws release the spoke, unless the hub clamp is first released, the end of the spoke, which is still hot, will be strained and stretched so that the headed and shouldered connection with the hub is imperfect. Even the release of the hub clamp to permit relative movement between the table and hub will not cure the defect if the hub center is too small to permit the full return of the header without the hub wall being engaged thereby and the hub moved relatively to the vise jaws.

It is the object of the present invention to obviate these and other objectionable defects in a machine of the class described and to lessen the skill required in the manipulation of the machine.

To this end, and in its broader aspects, the present invention contemplates a machine equipped with means to inaugurate the operation of the machine and means responsive to the operation of the machine to control successive operations thereof in the desired sequence. More specifically, the machine is equipped with a main valve actuable by the foot treadle and an auxiliary valve actuated by the movement of the vise jaws. A partial downward stroke of the foot treadle, the extent of which is determined by a stop, actuates the main valve to exhaust air from the table-lifting cylinder and allow the table to descend to locate the spoke in operative relation to the vise jaws and the header. As the table comes to rest in its lower position, the stop is moved to inoperative position to permit the completion of the downward stroke of the foot treadle, effecting a further actuation of the main valve for the admission of air into the jaw-actuating cylinder to close the vise jaws on the spoke and also for the admission of air to the auxiliary valve. The closing movement of the vise jaws actuates the auxiliary valve to admit air into the cylinder for effecting the movement of the header and table toward the vise jaws to upset the spoke to form the head and shoulder thereon. After the spoke-upsetting operation is completed, release of the foot treadle actuates the main valve to exhaust air from the vise jaw-actuating cylinder to release the jaws from the spoke, and their movement, in turn, actuates the auxiliary valve to exhaust air from the header and table actuating cylinder to permit the retraction of the header and table. As the return stroke of the foot treadle is completed, the main valve is operated to admit air to the table-lifting cylinder to raise the piston therein and tilt the front end of the table to its upper position and, at the same time, move the stop back into its operative position to limit the initial downward stroke of the foot treadle.

Referring to the drawings:

Fig. 1 is a side elevation of the machine, showing by the dot and dash lines the tilted position of the wheel supporting table;

Fig. 2 is a perspective view of a spacing member for determining the distance between the upper and lower arms of the table;

Fig. 3 is a perspective view of another spacing member;

Fig. 4 is a front elevation of the machine;

Fig. 5 is a rear elevation of the machine;

Fig. 6 is a fragmentary side elevation of the lower forward portion of the machine, looking from the right-hand side of Fig. 4;

Fig. 7 is a sectional view, partly broken away, taken on the line 7—7 of Fig. 6, looking in the direction of the arrows;

Fig. 8 is a side elevation, partly in section and partly broken away, of the auxiliary valve mechanism indicated by the arrow in Fig. 16;

Fig. 9 is a sectional view taken on the line 9—9 of Fig. 8, looking in the direction of the arrows;

Fig. 10 is a sectional view taken on the line 10—10 of Fig. 9, looking in the direction of the arrows;

Fig. 11 is a sectional view taken on the line 11—11 of Fig. 9, looking in the direction of the arrows;

Fig. 12 is a sectional view taken on the line 12—12 of Fig. 13, looking in the direction of the arrows;

Fig. 13 is a sectional view taken on the line 13—13 of Fig. 12, looking in the direction of the arrows;

Fig. 14 is a sectional view, partly broken away, taken on the line 14—14 of Fig. 7;

Fig. 15 is a diagrammatic lay-out of the air piping system;

Fig. 16 is a view taken approximately on the line 16—16 of Fig. 1, looking in the direction of the arrows;

Fig. 17 is a perspective view of the auxiliary valve and associated parts;

Fig. 18 is a sectional view taken on the line 18—18 of Fig. 16, looking in the direction of the arrows;

Fig. 19 is a cross-section taken approximately on the line 19—19 of Fig. 20, some of the parts being broken away to show the construction;

Fig. 20 is a fragmentary elevation, partly broken away and partly in section, as indicated by the line 20—20 of Fig. 19;

Fig. 21 is a sectional view taken on the line 21—21 of Fig. 6, looking in the direction of the arrows;

Fig. 22 is a sectional view of the table hold-down device;

Fig. 23 is a sectional view taken on the line 23—23 of Fig. 20, looking in the direction of the arrows;

Fig. 24 is a disjoined elevation of the table-lifting cylinder adjusting mechanism, other parts being broken away;

Fig. 25 is a fragmentary sectional elevation taken approximately on the line 25—25 of Fig. 24, looking in the direction of the arrows;

Fig. 26 is a side elevation of the upper part of the machine, partly broken away and partly in section as indicated by the line 26—26 of Fig. 4, looking in the direction of the arrows;

Fig. 27 is a side elevation of the hub clamping ram, partly broken away and partly in section as indicated by the line 27—27 of Fig. 29, looking in the direction of the arrows;

Fig. 28 is a sectional view, partly broken away, taken on the line 28—28 of Fig. 27, looking in the direction of the arrows;

Fig. 29 is a sectional view taken on the line 29—29 of Fig. 27, looking in the direction of the arrows;

Fig. 30 is a view, partly broken away and partly in section, as indicated by the line 30—30 of Fig. 26, looking in the direction of the arrows;

Fig. 31 is a plan view, partly broken away and partly in section, as indicated by the line 31—31 of Fig. 32, looking in the direction of the arrows;

Fig. 32 is a sectional view taken on the line 32—32 of Fig. 31, looking in the direction of the arrows; and Fig. 33 is a sectional view taken on the line 33—33 of Fig. 32, looking in the direction of the arrows.

In general

The machine comprises a base 1 (see Figs. 1, 4 and 5) on which front, rear and intermediate pedestals 2, 3 and 4, respectively, are mounted and which support two horizontal parallel guide bars 5 and 6 circular in cross-section, these parts constituting the main frame of the machine. Mounted in the frame are the three fundamental units of the machine, namely, the work supporting table 7 with its associated hub-clamping ram 8 and lifting cylinder 9, the spoke-clamping vise jaws 10 and 11 and their actuating cylinder 12, and the header 13 and its actuating cylinder 14.

The table 7 (see Fig. 26) is formed with upper and lower arms 15 and 16, respectively, the lower arm 16 being pivotally mounted on studs 17 at its front end by which it is connected to a slide 18 mounted for reciprocation on a supporting plate 19 pivoted at its rear end as at 20 to a collar 21. The collar 21 is mounted for vertical adjustment on a cylindrical machined column 22 of the rear pedestal 3, the adjustment of the collar 21 to determine the set position of the rear end of the table being effected by means of a hand wheel 23 fixed to a screw 24 supported in a bearing 25 of a bracket 26 and passing through an internally threaded lug 27 formed on the collar 21.

The upper arm 15 of the table carries the hub clamping ram 8, which is mounted to slide in a bronze bushing 28 in a fixed supporting bracket 29 secured to the forward end of the arm, and an air cylinder 30 mounted on the top edge of the arm. The clamping ram 8 is connected to the air cylinder 30 by a double lever 31 pivoted to the upper table arm 15 on a pin 32 intermediate the ram and the air cylinder and extending rearwardly beyond the air cylinder connection 33, its free ends being adapted to support weights 34 to counterbalance the ram. The ram is actuated by a piston 48 located in the air cylinder 30 and under the control of a simple two-way valve 35 operable by the movement of a pull rod 36 extending toward the front of the machine.

The table-lifting air cylinder 9 is mounted on the base 1 of the machine beneath the forward end of the table and is connected with the table slide 18 by a pair of vertical side links 37. The links 37 are fastened at their lower ends to a cross-head 38 on a rod 39 of a piston 40 in the cylinder 9 and extend upwardly through bearings 37a formed in the frame and in which they slidingly engage for vertical movement only. The upper ends 44 of the links 37 are T-shaped and formed with elongated slots 43 in which rollers 41 mounted on studs 42 fixed to the slide 18 are adapted to ride. The air cylinder 9 is mounted for adjustment as a whole by rotation of a hand wheel 45 acting through a series of shafts and bevel gears to rotate a low-pitch screw jack 46 (Fig. 19) on which the cylinder head 47 is supported, such adjustment providing for the easy, rapid and accurate vertical adjustment of the front end of the table 7 in its operative position.

Toward the front end of the machine the air cylinder 12 is mounted on the base 1 between depending arms 49 and 50 of the vise jaws 10 and 11, respectively, which arms are rotatably mounted on the parallel horizontal guide bars 5 and 6. The lower end of each of the arms 49 and 50 is adjustably connected by two links 53 and 54 to a rod 51 of a piston 52 (Fig. 16) within the cylinder 12. The arrangement is such that when the piston 52 rises in the cylinder 12, the connecting links 53 move toward a horizontal position and act through the links 54 to force the arms 49 and 50 outwardly in opposite directions to close the vise jaws 10 and 11 on a spoke and, upon descent of the piston 52, the links 53 move to their original inclined positions and pull the arms 49 and 50 toward one another to open the vise jaws and release the spoke.

The header mechanism comprises a centrally located shaft or header bar 55 (Figs. 4, 19, 31 and 32) having its front end mounted for reciprocation in a bearing 56 in the front pedestal 2 and its opposite end adjustably and removably mounted in a slide-block 57 mounted on the parallel guide bars 5 and 6 of the frame. Intermediate its ends, the header bar 55 is slidably supported in a bearing 58 in a split cross-head 59 of the intermediate pedestal 4, being held against rotation about its own axis by keys 60 formed thereon and riding in keyways 61 formed in the bearing 58. The air cylinder 14, located immediately in front of the rear pedestal 3, is equipped with a piston 63 having its piston rod 64 connected to a slide-block 65 mounted for vertical reciprocation in a guideway 66 formed in the front face of the rear pedestal, and a connecting link 67 is pivotally secured at one end to the slide-block 65 and at its opposite end to the slide-block 57 which supports the rear end of the header bar 55. When the piston 63 rises in the cylinder 14, forcing the slide-block 65 upwardly, the link 67 is moved toward a horizontal position, thus forcing the slide-block 57 forwardly on the parallel guides 5 and 6 and moving the header bar 55 with it.

As already stated, during the spoke-upsetting operation, the table 7 is moved forwardly half as far as the header bar 55. This is accomplished by pivotally securing the ends of a pair of pendant lever arms 68 and 69 (Figs. 1, 4 and 5) to opposite sides of the adjustable collar 21 on the rear pedestal 3 and connecting their opposite or lower ends by a pair of side links 70 and 71, respectively, to the opposite ends of the slide-block 57 (Fig. 31) which supports the rear end of the header bar 55, and also pivotally securing the ends of a pair of adjustable links 72 and 73 (Fig. 30) substantially midway between the ends of the pendant lever arms 68 and 69 and connecting their opposite ends to bosses 74 and 75 at the sides of the table slide 18. Thus, when the slide-block 57 supporting the rear end of the header bar 55 moves forwardly, it pulls the lever arms 68 and 69 through the connecting links 70 and 71 attached thereto, and this movement of the lever arms acts through the links 72 and 73 connecting them with the table slide 18 to move the table in the same direction as the header bar. However, since the links 72 and 73 are connected midway between the ends of the lever arms 68 and 69, the movement imparted to the table is only half that of the header bar.

When air is exhausted from the cylinder 14 and the piston 63 descends, the header bar 55 and table 7, along with their various connecting links, are returned to their nomal positions by springs 76 secured at one end to the slide-block 57 and having their opposite ends anchored to a fixed part of the machine.

*Work supporting table*

The work supporting table 7 is best shown in Figs. 1 to 3, 19, 20 and 26, and comprises the upper and lower arms 15 and 16 spaced apart vertically at the front and joined together at the rear by bolts 78 passing through flanges 79 and 80 on the upper and lower arms 15 and 16, respectively, and through spacing members 81 and 82 between the rear ends of the table arms, the member 81 being adapted to be replaceable by one of different thickness to vary the vertical distance between the upper and lower arms when desired. As already stated, the table 7 is mounted on the slide 18 arranged for reciprocation on a plate 19 by which the table unit is pivoted to the collar on the rear pedestal 3, the slide 18 having a dovetail connection 83 with the plate 19, as best seen in Fig. 19. The lower arm 16 of the table is pivotally mounted on the studs 17 at the forward end of the slide 18 and carries a plate 84 which is formed with an opening 85 (Fig. 30) in its front end to accommodate a hub support 86. The plate 84 is adapted to be adjustable fore and aft relatively to the lower table arm 16. For this purpose, a threaded stud 87 is fixed at one end in a lug 88 on top of the plate 84 and passes freely through an opening in a lug 89 rising from the arm 16, a pair of adjusting nuts 90 being threaded on the stud 87 on opposite sides of the lug 89. Turning of the nuts 90 in one direction or the other moves the plate forwardly or rearwardly, as the case may be, and it is held in set position by locking bolts 91 extending through elongated slots 92 in the plate 84. A threaded stud 93 is pivotally connected as at 94 to the rear end of the slide 18 and adapted to extend upwardly through a slot 95 formed in a forward extension 96 of the spacing member 82, adjusting and lock-nuts 97 being provided on the stud on opposite sides of the extension 96 for raising and lowering the rear end of the table relatively to the slide 18 to locate the table according to the angle of the spoke openings in the hub, the front end of the table rocking about the studs 17 by which it is connected to the slide. With this arrangement, when the table 7 occupies its operative position, the slide 18 and the spoke will lie in parallel horizontal planes, so that pressure exerted through the slide during the forward movement of the slide and table to upset the spoke to form the shoulder will always be in a plane parallel with the longitudinal axis of the spoke, regardless of the angle of the table relatively to the slide.

Hub clamping ram

The hub clamping ram 8 is best shown in Figs. 1, 4, 5, 26 and 27 to 29, and comprises a heavy shaft 98 mounted for vertical reciprocation in the bronze bushing 28 in a bearing 99 at the forward end of the bracket 29 secured to the upper arm 15 of the table 7. The shaft 98 is adapted to be reciprocated by the movement of a piston 48 in the air cylinder 30 and is connected to the piston by the double arm lever 31, whose arms 100 and 101 (Fig. 29), connected by a cross-head 102, extend rearwardly on opposite sides of the table arm 15, being pivotally supported on the pin 32 mounted in a bearing 103 formed in the arm 15. Rearwardly of the pin 32, the arms 100 and 101 are pivotally connected at 33 to the lower ends of a pair of connecting links 104 and 106, which are vertically disposed at opposite sides of the cylinder 30, the upper ends of the links 104 and 105 being pivoted on lugs 106 projecting from opposite ends of a cross-head 107 through which is threaded the end of rod 108 of the piston 48 in the cylinder 30. The cross-head 107 is adapted to slide vertically on guide rods 109 and 110 rising from bosses 111 and 112, respectively, on opposite sides of the upper edge of the cylinder 30, being raised by the piston 48 against the action of compression springs 113 arranged on the guide rods and which are held under the desired tension by adjusting nuts 114 on the ends of the guide rods, the springs 113 exercising themselves to return the parts to their inoperative positions when air is exhausted from the cylinder 30 and being assisted by the counterbalancing effect of the weights 34 on the rear ends of the lever arms 100 and 101.

The lower part of the shaft 98 is enlarged and formed in its lower end with a drill hole 115 (Fig. 28) to accommodate a stud 116 fixed therein by a pin 117 and which is formed with a ball 118 adapted to project beyond the end of the shaft 98. A head 119 for the ram is adapted to be secured to the ball 118 and provide for a universal movement of the head to allow it to accommodate itself to the edge of the hub regardless of the angle at which the latter is supported on the table or of any irregularities of its surface. In order to secure the head 119 to the ball 118, it is fastened by bolts 120 to a cap 121 adapted to be positioned over the ball before the latter is fixed to the end of the shaft 98, both the cap 121 and head 119 being formed with recesses 122 and 123, respectively, conforming to the shape of the ball and loosely engaging therewith when the parts are bolted together. In order to limit the rocking and rotational movement of the head 119, the ball 118 is formed with lugs 124 extending in opposite directions therefrom and adapted to fit in vertical grooves 125 formed in the cap.

The cross-head 102 is formed with forwardly extending lugs 126 adapted to straddle the enlarged lower end of the shaft 98, each lug 126 being formed with an opening 128 adapted to accommodate a shouldered stud 129 bolted therein and held against rotation by a set screw 130. Each stud 129 provides a bearing surface 131 on which a roller 132 is mounted and retained between the head 133 of the stud and a washer 134 adjacent the inner surface of the arm 127. The rollers 132 engage in runways 135 formed in opposite sides of the shaft 98 and which extend fore and aft throughout the width thereof, the arrangement providing a connection by which wear of the relatively movable parts is minimized.

The operation of the ram is manually controlled by the pull rod 36 connected to a crank arm 136 for actuating the valve 35 and extending toward the front of the machine. Movement of the pull rod 36 toward the front of the machine opens the valve 35 to admit air to the cylinder and raise the piston therein. When the piston rises in the cylinder 30 carrying with it the cross-head 107, the links 104 and 105 pull the lever arms upwardly, moving the shaft 98 downwardly and forcing the head 119 against the upper surface of a hub supported on the table 7. Return movement of the rod 36 closes off the supply of air to the cylinder 30 and opens a port for the exhaust of the air from the cylinder into the atmosphere, allowing the piston to descend in the cylinder 30 under the influence of the springs 113, the rear ends of the lever arms being moved downwardly to raise the shaft 98 and release the clamping pressure of the head 119 on the hub. The stroke of the ram 8 is very long and usually sufficient for hubs of all sizes, but in cases where it is not sufficiently long, or when for any other reason it is desirable, a filler piece 137 may be bolted to the head 119 of the ram.

Table lifting mechanism

The mechanism for lifting the front end of the table 7 is adapted for quick manipulation as a whole to adjust the vertical height of the front end of the table for hubs of different sizes and the rapidity of adjustment renders it possible to change the position of the front end of the table very quickly for each individual spoke in cases where the holes in the hub walls are not uniformly located. The table lifting mechanism is best shown in Figs. 1, 7, 19, 20, 24 and 25, and comprises the air cylinder 9 with the piston 40 therein having its rod 39 connected to the table 7 by vertical side links 37. The cylinder 9 is mounted on the base 1 and arranged to move vertically, being provided with a bracket 9a fixed to its uppper edge and formed for interfitting engagement with a guide bracket 140 rigidly secured to the intermediate pedestal 4 by bolts 141. The piston 40 rests on the cylinder head 47 when in its lower position and the piston rod 39 is screw threaded into a cross-head 142 extending toward opposite sides of the machine and arranged to slide vertically on a pair of guide rods 143 secured at their lower ends in bosses 144 on opposite sides of the cylinder 9 and at their upper ends in a horizontal extension 145 of the guide bracket 9ᵃ fixed to the cylinder 9. The lower ends of the links 37 are pivotally secured as at 146 to the opposite ends of the cross-head 142 and extend upwardly through the bearings 37ᵃ formed on opposite ends of the cross-head 59 of the intermediate pedestal 4 and in which bearings they engage for sliding vertical movement only. The upper ends of the links 37, in the form of the T-shaped heads 44, are formed each with the elongated slot 43 adapted to accommodate the roller 41 mounted on a stud 42 secured to the table slide 18. With this arrangement, when air is admitted into the cylinder 9, the piston 40 rises therein, carrying with it the cross-head 142 threaded on the piston rod 39 and through the connecting links 37 raises the front end of the table 7, which rocks about the pivot 20 by which the slide 18 is connected to the collar 21 on the rear pedestal 3. When the table 7 is in its lower operative position and the slide 18 is reciprocated to move the table forward during the spoke upsetting operation, the side links 37 are held in their vertical positions by the side walls of the bearings 37ᵃ and the rollers 41 move back and forth in the slotted openings 43 in the heads 44 of the links, thus permitting freedom of movement of the table slide 18 in a truly horizontal path and minimizing wear of the relatively moving parts.

The table lifting mechanism as a whole is adapted for adjustment vertically by means of the hand wheel 45 conveniently located near the front end of the machine. To this end, instead of being mounted directly on the base 1, the head 47 of the cylinder 9 is mounted on the screw jack 46 comprising a square threaded screw sleeve 148 secured to the cylinder head by a stud 149 screwed into a threaded opening 150 in the cylinder head and secured by a pin 151, the stud 149 being formed with a bearing surface 152 for the sleeve 148 and held thereon by a nut 153 threaded on the lower end of the stud. A bevel ring gear 155, having an internally square threaded hub 156 is threaded onto the sleeve 148 and rests on a bearing 157 between it and a support 158 mounted on the base 1 of the machine, being held against vertical movement relatively to the support 158 by a cover plate 159 screwed on the lower end of the ring gear hub 156 and engaging a shoulder 160 on the support. Thus, the ring gear 155 acts as a nut on the threaded sleeve 148 and, being capable of rotary movement only, its rotation in one direction or the other will cause the cylinder 9 and associated parts to be raised or lowered as the case may be. The ring gear 155 is adapted to be rotated by the hand wheel 45 through a series of bevel gears and the shafts on which they are mounted. Thus, a bevel gear 161 adapted to mesh with the ring gear 155 is mounted on one end of a shaft 162 journaled in a bearing 163 on the base 1 and having fixed to its opposite end a bevel gear 164 meshing with another bevel gear 165 fixed to the lower end of a shaft 166 extending upwardly at an angle along the side of the machine, the shaft being secured to the frame by straps 167. The upper end of the shaft 166 has a bevel gear 168 fixed to it and arranged to mesh with a bevel gear 169 fixed to one end of a shaft 170 journalled in a bracket 171 secured to the main frame and on the opposite end of which shaft 170 the hand wheel 45 is mounted. With this arrangement, the hand wheel 45 may be operated readily from a position in front of the machine to rotate the ring gear 155 to effect the raising and lowering of the front end of the table 7 to locate it in the desired position for the particular hub in use, and the very low pitch threads on the gear hub 156 and sleeve 46 permit of a fine adjustment of the table and also serve to hold the table in adjusted position. The weight of the table 7 is counterbalanced by a weight 62 at the rear of the machine supported on a rod 77 pivoted to the end of an arm 138 whose opposite end is secured to the spacing member 82 between the arms 15 and 16 of the table, so that in operation the table lifting and adjusting means are relieved of the burden of overcoming the full weight of the table.

*Spoke clamping vise jaws*

The spoke clamping vise jaws 10 and 11 and their operating mechanism are shown in Figs. 1, 4, 16 to 18, 20 and 26, and as already stated the vise jaws are pivotally mounted on the parallel guide bars 5 and 6 and are adapted to be actuated by the rise and fall of the piston 52 in the air cylinder 12 mounted on the base 1 near the front of the machine. Each of the vise jaws 10 and 11 is formed in its inner face (see Fig. 26) with a recess 171 to accommodate a removable die section 172 for shaping the spoke shoulders, the sections being removable for interchangeability as required. Near its lower end, each of the arms 49 and 50 is formed with a threaded opening to accommodate an adjusting bolt 173 which engages the edge of the pendant link 54 pivoted at its upper end between the arms of a bifurcated lug 174 formed on the inner edge of the respective arm, the end of the link having a lug 175 formed thereon and adapted to be engaged by a second adjusting bolt 176 threaded through an opening in the arm. The opposite end of the link 54 (see Figs. 16 and 18) is pivotally connected by a pin 177 to the links 53, whose opposite ends are pivoted on a pin 178 extending through a split collar 179 loosely surrounding a recessed portion 180 of the piston rod 51 and held against rotation by two pins 181 extending through slots 182 in the piston rod. The recess 180 in which the collar 179 is fitted is slightly longer than the height of the collar and the slots 182 are vertically elongated to permit a slight amount of lost motion, the end walls of the recess 180 providing surfaces against which the upper and lower edges of the collar 179 abut in the operation of the machine. In adjusting the jaws 10 and 11 to space them the proper distance from one another, if the bolts 173 are loosened and the bolts 176 tightened, the jaws will be moved in the direction of the arrows (Fig. 16) to space them farther apart, whereas if the bolts 176 are loosened and the bolts 173 tightened, the jaws will be brought closer together.

With the foregoing arrangement, when air is admitted into the cylinder 12, the piston 52 moves to its upper position and the links 53 are in the nearly horizontal position shown in Fig. 16, forcing the arms 49 and 50 outwardly to hold the vise jaws closed. Upon the exhaust of air from the cylinder 12, the piston 52 descends, as indicated by the arrow and carries the ends of the links 53 connected to the collar 179 downwardly to the inclined position shown in Fig. 17, the descent of the piston 52 and associated parts being effected by the pull of springs 183 connected at one end to the pins 178 and having their opposite ends secured to the base of the cylinder 12. This downward movement of the links 53 pulls the lever arms 49 and 50 toward one another rocking the jaws 10 and 11 in the direction of the arrows in Fig. 16 to open position.

Header and table actuating mechanism

The header and table moving mechanism is shown in Figs. 1, 26 and 30 to 33. The header 13 is removably mounted in a sleeve 184 formed in the slidable header bar 55, being held in the sleeve by bolts 185. The header bar 55 is secured to the slide block 57 by a pair of nuts 186 and 187 on the threaded rear end 188 of the header bar 55 and located on opposite sides of a wall 189 formed by providing a recess 190 in the block 57 to accommodate the nut 187, the threaded end 188 of the header bar 55 passing freely through an opening 191 in the wall 189, and the nuts 186 and 187 are formed with a plurality of radial openings 192 in their peripheral surfaces adapted for the insertion of a suitable tool to turn them.

The header bar 55 is moved forwardly during the spoke upsetting operation by the rise of the piston 63 in the air cylinder 14 mounted on the base 1 immediately in front of the rear pedestal 3. The piston rod 64 has a threaded end 193 which is screwed into a threaded opening 194 in the lower end of the slide block 65 to provide an adjustable connection therewith, the adjustment being effected by rotation of a hand wheel 195 to raise or lower the block 65 and locate the header relatively to the hub with which it is to be used, a lock nut 196 on the threaded end of the piston rod maintaining the parts in adjusted position. The slide-block 65 is arranged to reciprocate vertically in the guideway 66 formed in the front face of the pedestal 3 and is connected by the toggle link 67 to the slide-block 57 in which the rear end of the header bar 55 is secured. The toggle link 67 is in the form of a rod formed at each end with a cross-head 197 circular in cross section and adapted to be secured to the slide-blocks 57 and 65 by split bearings 198 and 199, respectively. For holding the slide-block 65 in its guideway and also for guiding it in its vertical movement, the bearing 199 is formed with machined surfaces 200 adapted for sliding engagement with machined faces formed on arms 201 secured to the parallel guide bars 5 and 6.

In operation, when air is admitted into the cylinder 14, the piston 63 and slide-block 65 are moved upwardly, the slide block 65 carrying with it the rear end of the link 67 and causing the link to approach a horizontal position. In so doing, the header bar 55 is forced forwardly, thus moving the header 13 toward the vise jaws 10 and 11 to effect the spoke upsetting operation. When air is exhausted from the cylinder 14 and the piston 63 descends under the pull of the tension springs 76 fastened to the slide-block 57 and the arms 201, the piston carries the slide-block 65 downwardly with it and, through the link 67, retracts the header bar 55 to its original position. When the header bar 55 moves forward, the links 70 and 71 pull the pendant lever arms 68 and 69 in a counter-clockwise direction and through the links 72 and 73 move the table slide 18 forwardly. However, since the links 72 and 73 are connected midway between the ends of the pendant arms, as at 202, the forward movement of the table slide 18 is only half that of the header bar 55. Upon retraction of the header bar 55, the pendant arms 68 and 69 are swung in a clockwise direction and retract the table 7 to its original position.

Table guiding means

When the table 7 is moved forwardly during the spoke upsetting operation, it must be accurately held against sidewise movement, otherwise the upsetting operation will result in the formation of a shoulder and a spoke head which are defective both in their connection with the hub and in appearance. To guard against this, as shown in Figs. 1, 17, 19 and 20, portions of the side edges of the table slide 18 are accurately machined to provide surfaces parallel to the center line of the table, and heavy guide plates 203 are secured by bolts 204 on opposite sides of the slide 18, each guide plate 203 being recessed as at 205 and machined accurately to fit over the machined edge of the slide. The opposite ends of the cross-head 59 of the intermediate pedestal 4 are machined parallel with the center line of the table to provide bearing surfaces 206 adapted to be slidably engaged by inner machined surfaces 207 of the guide plates 203. The plates 203 are relatively long and maintain their engagement with the bearing surfaces 206 in all vertical positions of the table, being free to move relatively to the bearing surfaces 206 when the table is raised and lowered. The arrangement provides guiding surfaces of sufficiently large areas to resist the great forces exerted which tend to twist the table and the horizontal movement of the table is always in a plane parallel with the longitudinal axis of the spoke.

Table hold down device

When the pressure exerted during the spoke upsetting operation acts on a level which is higher than the pivot point 20 at the rear end of the slide 18, it frequently overcomes the weight of the table 7 and causes the front end of the table to rise, resulting in the formation of an imperfect head and shoulder on the spoke and a defective connection of the spoke with the hub. In order to obviate this, an automatically operated device is provided which acts positively to hold the table 7 in its lower position while the spoke upsetting operation is taking place. This device, shown in Figs. 20, 22 and 23, comprises a pin 208 adapted to be projected to a position above a nut 209 on the end of the table lifting piston rod 39 when the table is in its lower position, being actuated automatically by the movement of the vise jaw actuating piston 52 through a series of connections between the top of the piston rod 51 and the pin. The pin 208 is arranged to slide in a three-part bushing 210 arranged in a bearing 211 formed in the bracket 9a, and at its rear end the pin is bifurcated to receive one end of a link 212 which is pivotally connected thereto by a pin 213. The opposite end of the link 212 is connected to twin bell-crank levers 214 pivotally mounted on a pin 215 passing through bearings 216 formed on the bell-crank levers and a cross-head 217 through which the piston rod 51 passes. The bell crank levers 214 are arranged on opposite sides of the cross-head 217 and their corresponding arms are parallel with one another, the forwardly extending arms 218 being connected to the end of the link 212 by a pin 219 passing through openings in the arms and the link and through spacers 220 between the arms and the link. The rearwardly extending arms 221 of the levers 214 are connected to the ends of a pair of links 222 and 223 disposed on opposite sides of the piston rod 51 and having their opposite ends pivoted on a pin 224 passing through a bearing 225 on the end of the piston rod. The pin 208 is kept well lubricated to prevent binding and the three parts of the bushing 210 in which it slides are slightly spaced from one another to provide oil grooves 226; and, in order to obviate the accumulation of dirt and foreign matter on the pin when in its retracted position, a hood 227 secured by bolts 228 to the intermediate pedestal 4 is arranged to cover the pin.

In the operation of the machine, the pin 208 occupies the position shown in Fig. 22 when the front end of the table 7 is in its raised position and the vise jaws are open. However, after the table has dropped to its lower position, as the piston 52 in the cylinder 12 moves upwardly to close the vise jaws 10 and 11, the rising of the piston rod 51 carries with it the links 223 and 224 which pull on the rear arms 221 of the bell-crank levers 214 and rotate the levers about the pivot pin 215 to the position shown in Figs. 20 and 23, moving the link 212 and pin 208 from the position shown in Fig. 22 to that shown in Fig. 20 to locate the end of the pin directly above the nut 209 on the end of the table lifting piston rod 39. When the spoke upsetting operation is completed and the vise jaw actuating piston 52 descends to close the vise jaws, the parts are returned from the position shown in Fig. 20 to that shown in Fig. 22, so that the pin 208 is retracted from above the nut 209 and the table lifting piston 40 is free to rise and lift the front end of the table 7 to its tilted position.

Air system and control valves

The air piping system and control valves are shown in Figs. 6 to 17, both inclusive. The hub clamping ram and the table lifting, vise jaw and header mechanisms are all pneumatically operated, taking their supply of air from a main feed pipe 230 (see Fig. 15) and being controlled by valves. As already stated, the hub clamping ram is controlled by the simple two-way valve 35 operated by the pull rod 36. The table lifting, vise jaw and header mechanisms, however, are controlled by a main valve 231, operated by a foot treadle 232, and an auxiliary valve 233 operated in response to the movement of the vise jaws 10 and 11, the main and auxiliary valves 231 and 233, respectively, both being of the double-headed piston type. The flow of air through the supply pipe 230 is controlled by a shut-off valve 234, beyond which the supply pipe 230 leads directly to the main valve 231, a branch conduit 235 extending from the pipe 230 to the valve 35 for controlling the operation of the hub clamping ram 8 and from which valve a conduit 236 leads to the cylinder 30. A conduit 237 leads from a port near the front end of the main valve 231 to the table lifting cylinder 9, and from the opposite end of the main valve 231 a conduit 238 leads to the vise jaw actuating cylinder 12. A conduit 239 leads from a port near the rear end of the main valve 231 to the auxiliary valve 233 located near the front end of the machine and from whence a conduit 240 leads to the header actuating cylinder 14, a shut-off valve 241 in the conduit 239 controlling the passage of air therethrough. The main valve 231 is equipped with a pipe 242 and the auxiliary valve 233 with a pipe 243 through each of which air exhausts from the respective valve to the atmosphere.

Referring particularly to Fig. 12, the main valve 231 comprises a cylinder 244 mounted on the base 1 and fitted at opposite ends with detachable heads 245 and 246 and with an internal sleeve 247. The sleeve 247 is formed with three circumferential series of small openings 248, 249 and 250, one, the series of openings 248, being located near the front end of the sleeve 247 and the two series of openings 249 and 250 being located close together near the opposite end of the sleeve 247, and a circumferential series of larger openings 251 located centrally of the sleeve 247. The series of openings 248, 249, 250 and 251 communicate, respectively, with continuous circumferential recesses 252, 253, 254 and 255 formed in the wall of the cylinder 244, and the recesses 252, 253, 254 and 255, in turn, communicate with ports 256, 257, 258 and 259, respectively. The main supply conduit 230 leads to the port 259 of the main valve 231 and the conduits 237, 238 and 239 lead from the ports 256, 257 and 258, respectively, of the main valve 231 to the table lifting cylinder 9, vise-jaw actuating cylinder 12, and the auxiliary valve 233. A piston 260 formed at opposite ends with heads 261 and 262, is arranged within the sleeve 247 in the main valve 231 and, by its reciprocation, is adapted to establish in the proper sequence communication between the three series of small openings 248, 249 and 250 in the sleeve 247 and the main supply of air, admitted through the central series of openings 251 to a cavity 263 between the piston heads 261 and 262, or to cut off such communication, as the case may be. The exhaust pipe 242 communicates with a port 264 in the cylinder head 245 for exhausting air from the interior of the sleeve 247 into the atmosphere, and the cylinder head 246 is formed with a series of exhaust ports 265 leading from the interior of the sleeve 247 to the atmosphere.

The auxiliary valve 233 is of the same general construction as the main valve 231 but has only two circumferential series of openings 266 and 267 formed in an internal sleeve 268 within a cylinder 269 and in which there is slidably arranged a piston 270 having heads 271 and 272 formed at the opposite ends thereof and which form between them an air supply cavity 325. The series of openings 266 are relatively large and centrally located, and communicate with a circumferential recess 273 and a port 274 formed in the wall of the cylinder 269 and to which port the conduit 239 leads from the main valve 231 and supplies air to the auxiliary valve 233; while the series of smaller openings 267 communicate through a circumferential recess 275 and port (not shown) with the conduit 240 leading to the header actuating cylinder 14. As in the case of the main valve 231, one cylinder head 277 of the auxiliary valve 233 is equipped with the exhaust pipe 243 and the opposite cylinder head 278 is formed with a series of exhaust ports 279.

The auxiliary valve 233 is supported by a bracket 280 extending laterally from the front pedestal 2 of the main frame of the machine and a piston rod 281 extends from the lower end of the piston 270 through the cylinder head 278. The end of the piston rod 281 is enlarged as at 282 and formed with an aperture 283 in which there is fitted the end of a horizontal arm 284 of a shaft 285, the arm 284 being adapted to extend through a guide slot 286 in a bracket 287 and being formed with collars 288 arranged to bear on opposite sides of the bracket. A vertical arm 289 of the shaft 285 is formed near its upper end with a collar 290 adapted to seat against the lower end of an exteriorly threaded sleeve 291 through which the end of the vertical arm 289 passes, a collar 292 being fixed to the end of the arm 289 to secure it to the sleeve. The sleeve 291 is formed at its upper end with a nut-like head 293 and is adapted to rotate freely on the arm 289 of the shaft 285, and the sleeve 291 is threaded into a block 294 pivotally supported on studs 295 fixed by pins 296 in arms 297 of the bifurcated end of a horizontal shaft 298 to provide a trunnion connection therewith, the shaft 298 extending to the right-hand (viewed from the front of the machine) vise jaw 10 to which it is rigidly secured. By rotation of the sleeve 291 in the block 294, the shaft 285 can be raised or lowered to adjust the piston 270 vertically relatively to the series of openings 266 and 267 in the sleeve 268 of the auxiliary valve 233, a guide comprising a pointer 299 formed on the enlarged end 282 of the piston rod 281 and a scale 300 secured to the bracket 287 being provided to determine the proper location of the piston.

The main valve 231 is adapted to be operated by the foot treadle 232 (see Fig. 6) formed at the end of a long arm 301 of a bell-crank lever 302 pivoted to the front pedestal 2 of the machine as at 303 and whose short arm 304 is pivotally connected at its free end as at 305 to one end of a slide rod 306. The slide rod 306 is connected to a piston rod 307 extending from the piston 260 of the main valve 231 by a turnbuckle connection 308 for adjusting the piston 260 relatively to the sleeve 247 in the main valve, and the rod 307 is slidably supported in brackets 309 and 310 mounted on the base 1 of the machine. At the side of the table lifting cylinder 9, a vertical shaft 311 is connected to the rod 307 and adapted for sliding engagement in a bearing 312 formed at one end of a horizontally disposed shaft 313 slidably supported in two bearings 314 and 315 formed on a bracket 316 fixed to the table-lifting cylinder. Intermediate the two bearings 314 and 315 on the bracket 316, a collar 317 is fixed to the horizontal shaft 313 and adapted to engage a stop 318 formed by the side face of a flattened end of a vertically disposed rod 319 (Fig. 14) whose upper end (Fig. 6) is secured to an arm 320 fastened to the end of the table-lifting piston rod 39, the rod 319 being adapted for movement with the piston rod 39 to locate the stop 318 in operative and inoperative positions, respectively, when the table 7 is raised and lowered. Thus, the stop 318 is adapted to be engaged by the collar 317 when the table 7 is in its upper position and allow a partial downward stroke only of the foot treadle 232. However, the stop 318 is moved out of the path of the collar 317 to permit the completion of the stroke of the foot treadle when the table 7 is down in its lower operative position, (compare the full and broken line positions of the stop 318 in Fig. 14). The return stroke of the foot treadle 232 is effected by a weight 321 (Fig. 1) at one end of a rod 322 connected at its opposite end to the bell-crank lever 302. The arrangement of the vertical and horizontal shafts 311 and 313 for relative movement is to maintain the relationship of the stop 318 and collar 317 when the table-lifting cylinder 9 is adjusted to different positions by the hand wheel 45, both the stop 318 and collar 317 being raised and lowered with the cylinder.

When a hub is placed on the table 7, movement of the pull rod 36 to the left (Fig. 15) rotates the crank arm 136 to open the valve 35 and admit air from the branch supply conduit 235 through the conduit 236 to the cylinder 30 to raise the piston 48 in the cylinder and actuate the ram 8 to clamp the hub in position on the table. Downward pressure on the foot treadle 232 rocks the bell-crank lever 302 counter-clockwise (Fig. 6) moving the slide rod 306 and piston 260 in the main valve 331 until the collar 317 strikes the stop 318. This movement of the piston 260 shuts off communication between the series of openings 248 in the sleeve 24 and the main air supply cavity 263 in the valve between the piston heads 261 and 262, allowing air to exhaust from the table-lifting cylinder 9 into the atmosphere through the series of openings 265 formed in the cylinder head 246. As the table 7 reaches its lower operative position, the rod 319 moving downwardly with the rod 39 of the piston in the table-lifting cylinder 9, carries the stop 318 downwardly out of the path of the collar 317 (full lines Fig. 14). The foot treadle 232 is then free to partake of its full stroke, being stopped by the abutment of the collar 317 against the end of the bearing 315 on the bracket 316 secured to the table-lifting air cylinder. This further movement of the foot treadle 232 moves the head 262 of the valve piston 260 to the right (Fig. 12) and establishes communication between the two series of openings 249 and 250 in the sleeve 247 and the air supply cavity 263, allowing air to pass through the first series of openings 249 and the conduit 238 leading to the vise-jaw actuating cylinder 12 to raise the piston 52 therein and close the vise jaws 10 and 11 on the spoke located between them by the descent of the table 7 to its lower operative position. Air also passes from the air supply cavity 263 in the valve 231 through the series of openings 250 and the conduit 239 to the auxiliary valve 233 and, as the vise jaws 10 and 11 reach their closed position, the rocking movement of the right-hand vise jaw 10 through the horizontal and vertical shafts 298 and 285 and the piston rod 281 moves the piston 270 in the auxiliary valve to the position shown in Fig. 9, establishing communication between the air supply cavity 325 and the openings 267 in the sleeve 268 to allow air to pass through the conduit 240 to the header actuating cylinder 14 for effecting the spoke upsetting operation. Release of the foot treadle 232 almost simultaneously shuts off communication between the air supply cavity 263 of the main valve 231 and the two series of openings 249 and 250, first allowing air to exhaust from the supply cavity 325 of the auxiliary valve 233 through the exhaust pipe 242 in the main valve into the atmosphere, which relieves slightly the pressure of the header 13 on the end of the spoke just prior to the exhaust of air through the series of openings 249 from the vise jaw actuating cylinder 12 to allow the descent of the piston 52 therein and the opening of the vise jaws. As the vise jaws 10 and 11 open, the piston 270 in the auxiliary valve 233 descends, cutting off communication between the air supply cavity 325 and the series of openings 267 communicating with the conduit 240 leading to the header mechanism actuating cylinder 14 and allowing the air therein to exhaust into the atmosphere through the conduit 243 in the head 277 of the auxiliary valve and allowing the springs 76 to retract the header mechanism and table. As the main valve piston 260 completes its return stroke, communication is established between the air supply cavity 263 and the series of openings 248 communicating with the conduit 237 leading to the table-lifting cylinder 9, causing the piston 40 therein to rise and lift the front end of the table 7 to its tilted position, the rod 319 being carried upward by the piston rod 39 to bring the stop 318 back into the path of the collar 317.

As already stated, the present invention obviates the necessity for skillful manipulation of the foot treadle 232 to effect the operation of the machine in the proper sequence in response to the actuation thereof. It is also to be noted that the change in the sequence of the machine operations obviates defects of the prior art and makes it impossible to disturb the connection of the spoke with the hub subsequent to the spoke-upsetting operation and while the spoke end is still hot and susceptible to stresses and strains to which it may be subjected accidentally. Thus, as the foot treadle 232 is released after the spoke upsetting operation and the piston 260 in the main valve 231 begins its return movement, the openings 250 in the sleeve 247 are uncovered by the valve piston head 262 for the exhaust of air from the cavity 325 of the auxiliary valve 233 slightly before the openings 249 are uncovered by the piston head 262 for the exhaust of air from the vise jaw actuating cylinder 12. The exhaust of air from the cavity 325 in the auxiliary valve 233 relieves the pressure on the header bar 55, so that there is no danger of the header exerting pressure on the spoke when the latter is suddenly released by the exhaust of air from the cylinder 12 and the opening of the vise jaws 10 and 11, it being remembered that the spoke is released by the vise jaws prior to the exhaust of air from the header actuating cylinder 14, since the auxiliary valve 233 is operated to exhaust air from the cylinder 14 by the opening movement of the right-hand vise jaw 10.

In the accompanying drawings, the invention has been shown merely by way of example and in preferred form, but obviously many modifications and variations may be made therein and in its mode of application which will still be comprised within its spirit. For example, the invention is applicable equally as well to machines for making wheel spiders, that is, wheel hubs with spokes fastened therein and to which the rim is secured subsequently. It is to be understood, therefore, that the invention is not limited to any specific form or embodiment except insofar as such limitations are specified in the appended claims.

Having thus described my invention, what I claim is:

1. In a wheel spoke securing machine, the combination of means actuable to clamp a spoke, means operable to secure the clamped spoke to a wheel member, means for effecting the actuation of the spoke clamping means, and means acting in response to the actuation of the spoke clamping means to effect the operation of the spoke securing means.

2. In a wheel spoke securing machine, the combination of means actuable to clamp a spoke, means operable to secure the clamped spoke to a wheel member, means for effecting the actuation of the spoke clamping means, and means acting in response to the actuation of the spoke clamping means for automatically effecting the operation of the spoke securing means.

3. In a wheel spoke securing machine, the combination of means actuable to clamp a spoke, means operable to secure the clamped spoke to a wheel member, a main control, and an auxiliary control, the main control being actuable for effecting each cycle of operation of the machine and the auxiliary control being automatically rendered operative during each machine cycle to effect the operation of the spoke securing means in timed relation to the actuation of the spoke clamping means.

4. In a pneumatically operated wheel spoke securing machine, the combination of a pair of spoke clamping vise jaws, means for actuating the vise jaws, spoke upsetting means, means for moving the spoke upsetting means, a main valve operable to effect the operation of the machine, and an auxiliary valve operable by the actuation of the vise jaws to effect the movement of the spoke upsetting means.

5. In a pneumatically operated wheel spoke securing machine, the combination of a pair of spoke clamping vise jaws, means for actuating the vise jaws, spoke upsetting means, means for moving the spoke upsetting means to active and inactive positions, a main valve operable to effect the operation of the machine, and an auxiliary valve operable by the actuation of the vise jaws to effect the movement of the spoke upsetting means, the actuation of the vise jaw to clamp a spoke operating the auxiliary valve to effect the movement of the spoke upsetting means to active position and the actuation of the vise jaws to release a spoke operating the auxiliary valve to return the spoke upsetting means to inactive position.

6. In a wheel spoke securing machine, the combination of a movable wheel hub support, means actuable to clamp a spoke, means to move the hub support into operative relation to the spoke clamping means, means to actuate the spoke clamping means, means operable to effect the cycle of operation of the machine, wherein the movement of the hub support and the actuation of the spoke clamping means occur successively, and means acting in response to the movement of the hub support to control the actuation of the spoke clamping means in timed relation thereto.

7. In a wheel spoke securing machine, the combination of a wheel hub support movable to active and inactive positions, spoke clamping means movable to active and inactive positions, means for moving the hub support, means for moving the spoke clamping means, means to effect the operation of the machine, and a stop movable with the hub support to control the actuation of the spoke clamping means in timed relation to the movement of the hub support.

8. In a wheel spoke securing machine, the combination of a wheel hub support movable to active and inactive positions, spoke clamping means movable to active and inactive positions, means for moving the hub support, means for moving the spoke clamping means, means to effect the operation of the machine to move the hub support and the spoke clamping means successively to their active positions in the order stated and to their inactive positions in reverse order during each cycle of operation of the machine, and a stop controlled by the movement of the hub support to render the spoke clamping means inoperative except when the hub support is in active position.

JOHN H. PLOEHN.